(12) United States Patent
Kovachka-Dimitrova et al.

(10) Patent No.: US 7,882,502 B2
(45) Date of Patent: *Feb. 1, 2011

(54) SINGLE FILE UPDATE

(75) Inventors: Monika M. Kovachka-Dimitrova, Sofia (BG); Rumiana G. Angelova, Dimitrovgrad (BG); Dimiter G. Dimitrov, Sofia (BG)

(73) Assignee: SAP AG, Walldorf (DE)

( * ) Notice: Subject to any disclaimer, the term of this patent is extended or adjusted under 35 U.S.C. 154(b) by 658 days.

This patent is subject to a terminal disclaimer.

(21) Appl. No.: 10/854,455

(22) Filed: May 25, 2004

(65) Prior Publication Data

US 2005/0268297 A1    Dec. 1, 2005

(51) Int. Cl.
*G06F 9/44* (2006.01)
*G06F 15/16* (2006.01)

(52) U.S. Cl. .................. 717/169; 717/171; 709/218

(58) Field of Classification Search .................. 717/169; 709/218
See application file for complete search history.

(56) References Cited

U.S. PATENT DOCUMENTS

| | | |
|---|---|---|
| 5,596,714 A | 1/1997 | Connell |
| 5,999,972 A | 12/1999 | Gish |
| 6,253,282 B1 | 6/2001 | Gish |
| 6,266,709 B1 | 7/2001 | Gish |
| 6,272,555 B1 | 8/2001 | Gish |
| 6,272,556 B1 | 8/2001 | Gish |
| 6,304,893 B1 | 10/2001 | Gish |
| 6,424,991 B1 | 7/2002 | Gish |
| 6,434,598 B1 | 8/2002 | Gish |
| 6,604,209 B1 | 8/2003 | Grucci et al. |
| 6,643,650 B1 | 11/2003 | Slaughter et al. |
| 6,725,453 B1 | 4/2004 | Lucas et al. |
| 6,745,387 B1 | 6/2004 | Ng et al. |
| 6,766,477 B2 | 7/2004 | Grucci et al. |
| 6,801,940 B1 | 10/2004 | Moran et al. |
| 6,832,238 B1 | 12/2004 | Sharma et al. |
| 6,996,588 B2 | 2/2006 | Azagury et al. |
| 7,076,798 B2 | 7/2006 | Chang et al. |
| 7,080,092 B2 | 7/2006 | Upton |
| 7,089,584 B1 | 8/2006 | Sharma |
| 7,150,015 B2 | 12/2006 | Pace et al. |
| 7,159,224 B2 | 1/2007 | Sharma et al. |
| 7,167,914 B2 | 1/2007 | Cohen et al. |
| 7,171,478 B2 | 1/2007 | Lueckhoff et al. |
| 7,246,358 B2 | 7/2007 | Chinnici et al. |

(Continued)

OTHER PUBLICATIONS

""Dreamweaver MX 2004 Using Dreamweaver"", *Macromedia*, Published: Sep. 10, 2003, Chapter 2, pp. 1, 2, 59-61.

(Continued)

*Primary Examiner*—James D Rutten
(74) *Attorney, Agent, or Firm*—Blakley, Sokoloff, Taylor & Zafman LLP

(57) ABSTRACT

A system and method are described for performing updating of an application using a single file update. In one embodiment, a request from a client is received at a server to amend a deployed application by updating a single file of the application. The request is received at a deploy service of the server. The file to be update is accessed and updated to amend the application. The transaction for successful updating of the file is committed to a database.

7 Claims, 17 Drawing Sheets

U.S. PATENT DOCUMENTS

| | | |
|---|---|---|
| 2001/0011265 A1* | 8/2001 | Cuan et al. .................. 707/1 |
| 2002/0178254 A1 | 11/2002 | Brittenham et al. |
| 2002/0188538 A1 | 12/2002 | Robertson et al. |
| 2002/0188869 A1 | 12/2002 | Patrick |
| 2003/0018694 A1 | 1/2003 | Chen et al. |
| 2003/0018832 A1 | 1/2003 | Amirisetty et al. |
| 2003/0046639 A1 | 3/2003 | Fai et al. |
| 2003/0050932 A1 | 3/2003 | Pace et al. |
| 2003/0061247 A1* | 3/2003 | Renaud ................. 707/205 |
| 2003/0093402 A1 | 5/2003 | Upton et al. |
| 2003/0154266 A1 | 8/2003 | Bobick et al. |
| 2003/0191803 A1 | 10/2003 | Chinnici et al. |
| 2003/0204645 A1 | 10/2003 | Sharma et al. |
| 2003/0236923 A1 | 12/2003 | Jeyaraman et al. |
| 2004/0068731 A1 | 4/2004 | Davis et al. |
| 2004/0078495 A1* | 4/2004 | Mousseau et al. ........... 710/1 |
| 2004/0078719 A1 | 4/2004 | Grucci et al. |
| 2004/0139154 A1 | 7/2004 | Schwarze |
| 2004/0148183 A1 | 7/2004 | Sadiq |
| 2004/0148370 A1 | 7/2004 | Sadiq |
| 2004/0148588 A1 | 7/2004 | Sadiq |
| 2004/0205101 A1 | 10/2004 | Radhakrishnan |
| 2005/0049938 A1 | 3/2005 | Venkiteswaran |
| 2005/0080801 A1* | 4/2005 | Kothandaraman et al. ... 707/100 |
| 2005/0097178 A1 | 5/2005 | Bala |
| 2005/0165910 A1 | 7/2005 | Kilian |
| 2005/0262189 A1 | 11/2005 | Mamou et al. |
| 2005/0262477 A1 | 11/2005 | Kovachka-Dimitrova et al. |
| 2005/0278274 A1 | 12/2005 | Kovachka-Dimitrova et al. |
| 2007/0033088 A1 | 2/2007 | Aigner et al. |

OTHER PUBLICATIONS

Kooijmans, Alex L., et al., "Enterprise JavaBeans for z/OS and OS/390 WebSphere Application Server 4.0", *IBM Corporation: International Technical Support Organization,*, pp. i-iiii, v-xvi and 61-132, (Dec. 2001), Chapter 5-7.

Orfali, Robert , "Client/Server Programming with JAVA and CORBA Second Edition", by Robert Orfali et al, Pages: cover page, title page, copyright page, 1-25, 27-31, 33-35, 37, 39-45, 47, 49-51, 53-67, 69, 71-91, 93, 95, 97-99, 101-109, 111, 113-115, 117, 119-123, 125, 127, 129, 131, 133, 135, 137, 139-141, 143-147, 149-151, 153-157, 159-161, 163, 165, 167-169, (1998).

Non-Final Office Action for U.S. Appl. No. 10/852,893, Mailed Dec. 31, 2008, 11 pages.

Final Office Action for U.S. Appl. No. 10/853,374, Mailed Jan. 28, 2009, 13 pages.

Non-Final Office Action for U.S. Appl. No. 10/854,449 Mailed Nov. 24, 2009, 34 Pages.

Final Office Action for U.S. Appl. No. 10/854,729, Mailed Mar. 5, 2009, 12 pages.

Non-Final Office Action for U.S. Appl. No. 10/854,449 dated Apr. 29, 2009; 25 pages.

Final Office Action for U.S. Appl. No. 10/853,067 dated Jun. 9, 2009; 27 pages.

Non-Final Office Action for U.S. Appl. No. 10/854,729, Mailed Jun. 18, 2009, 9 pages.

Office Action for U.S. Appl. No. 10/853,374, Mailed Jun. 25, 2009, 10 pages.

Notice of Allowance and Fees for U.S. Appl. No. 10/854,729, Mailed Feb. 16, 2010, 15 Pages.

\* cited by examiner

SINGLE FILE UPDATE

BACKGROUND

1. Field of the Invention

This invention relates generally to the field of application deployment. More particularly, an embodiment relates to a system and method for performing application update by using a single file update.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft NET standard and/or the Advanced Business Application Programming (ABAP) standard developed by SAP AG.

For example, in a J2EE environment, such as the one illustrated in FIG. 1C, the business layer 122 is to handle the core business logic of the application having Enterprise JavaBean™ (EJB or enterprise bean) components with support for EJB containers 134. While the presentation layer 121 is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. J2EE engine 130 is currently used in many large-scale application development and deployment projects for these reasons.

However, as application development projects grow larger and are diversified, deployment of applications becomes increasingly important. For example, it is useful to have an improved deployment service and management including a variety of containers, application interfaces, transaction management and modules, notification and information status systems, file updates, application updates and duplications, partial application deployments, resource pooling, and security checks.

SUMMARY

A system and method are described for performing updating of an application using a single file update. In one embodiment, a request from a client is received at a server to amend a deployed application by updating a single file of the application. The request is received at a deploy service of the server. The file to be update is accessed and updated to amend the application. The transaction for successful updating of the file is committed to a database.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
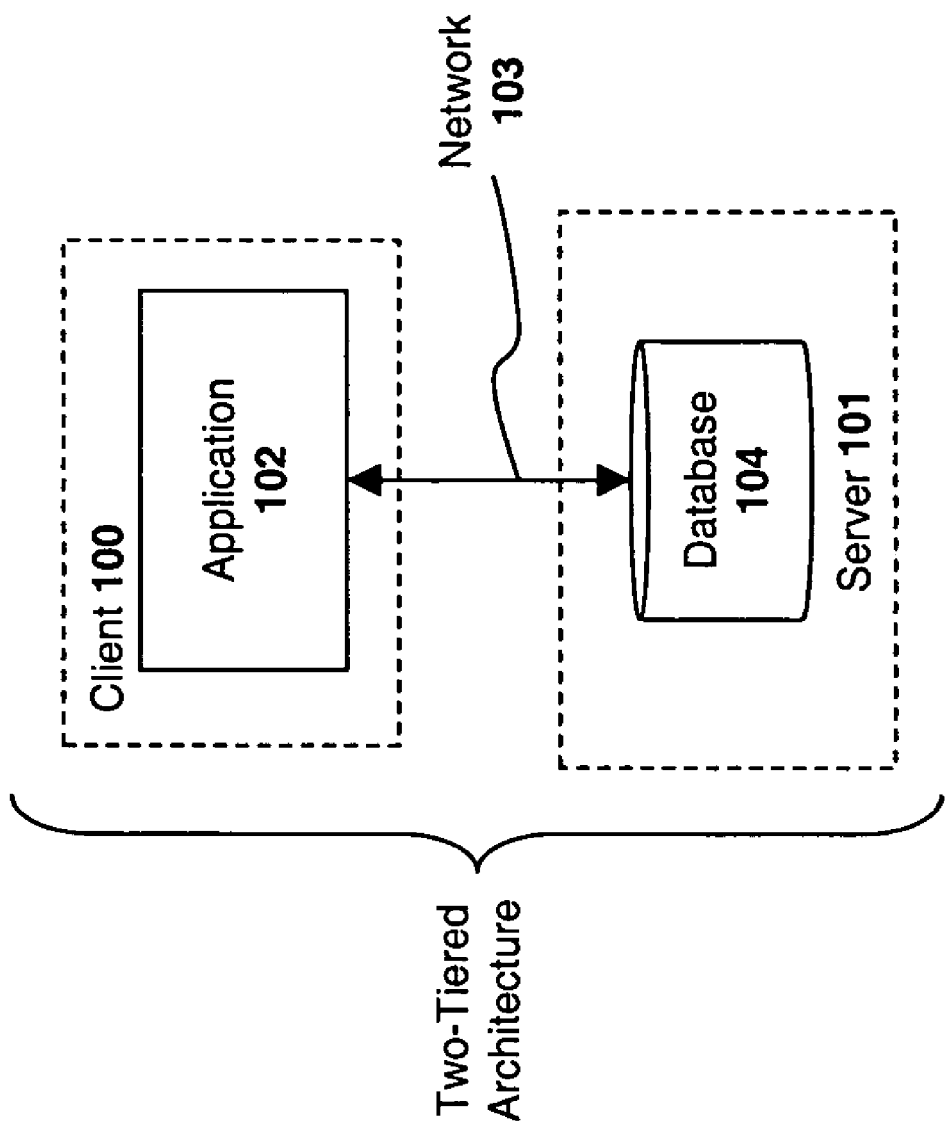
FIG. 1A is a block diagram illustrating a prior art two-tier client-server architecture.
Figure 1B:
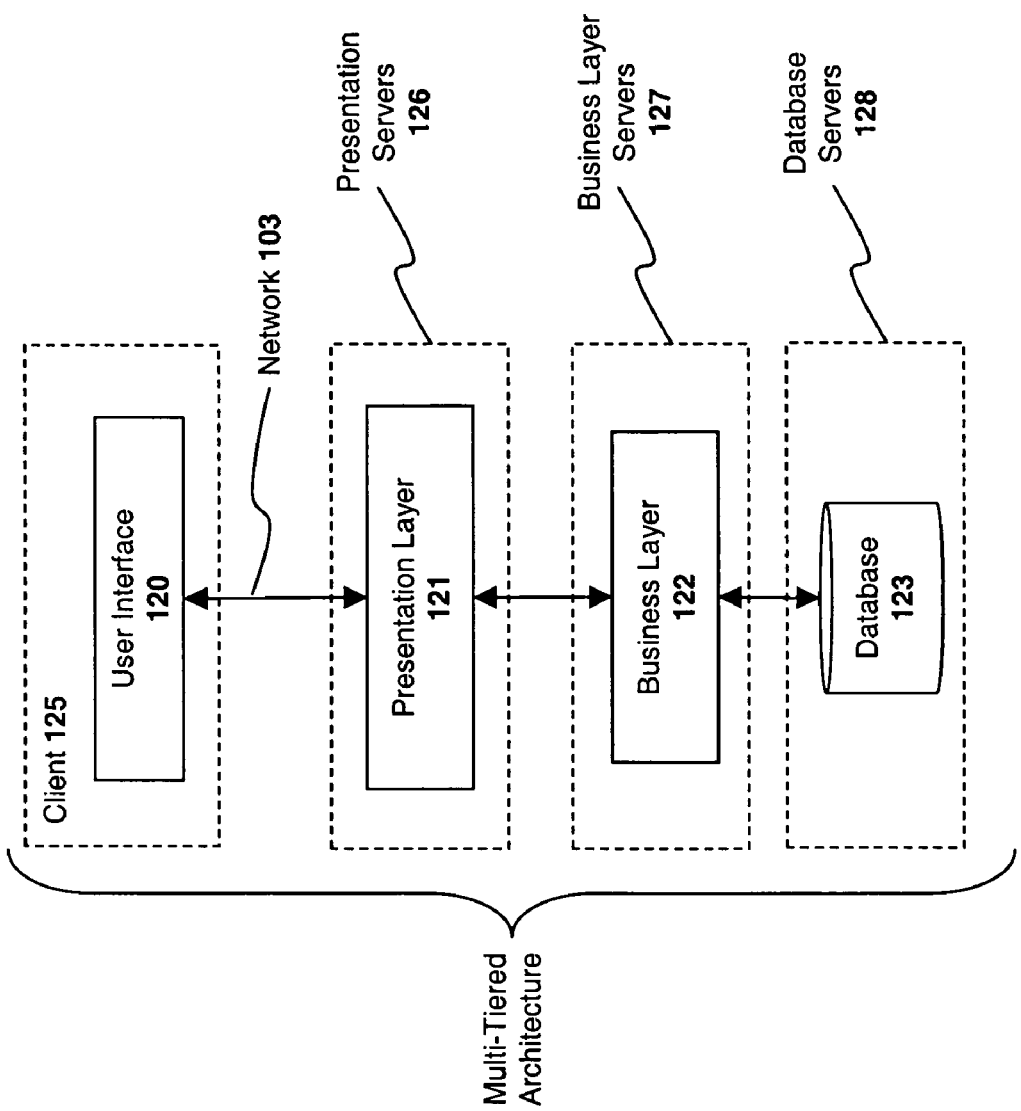
FIG. 1B is a block diagram illustrating a prior art multi-tier client-server architecture.
Figure 1C:
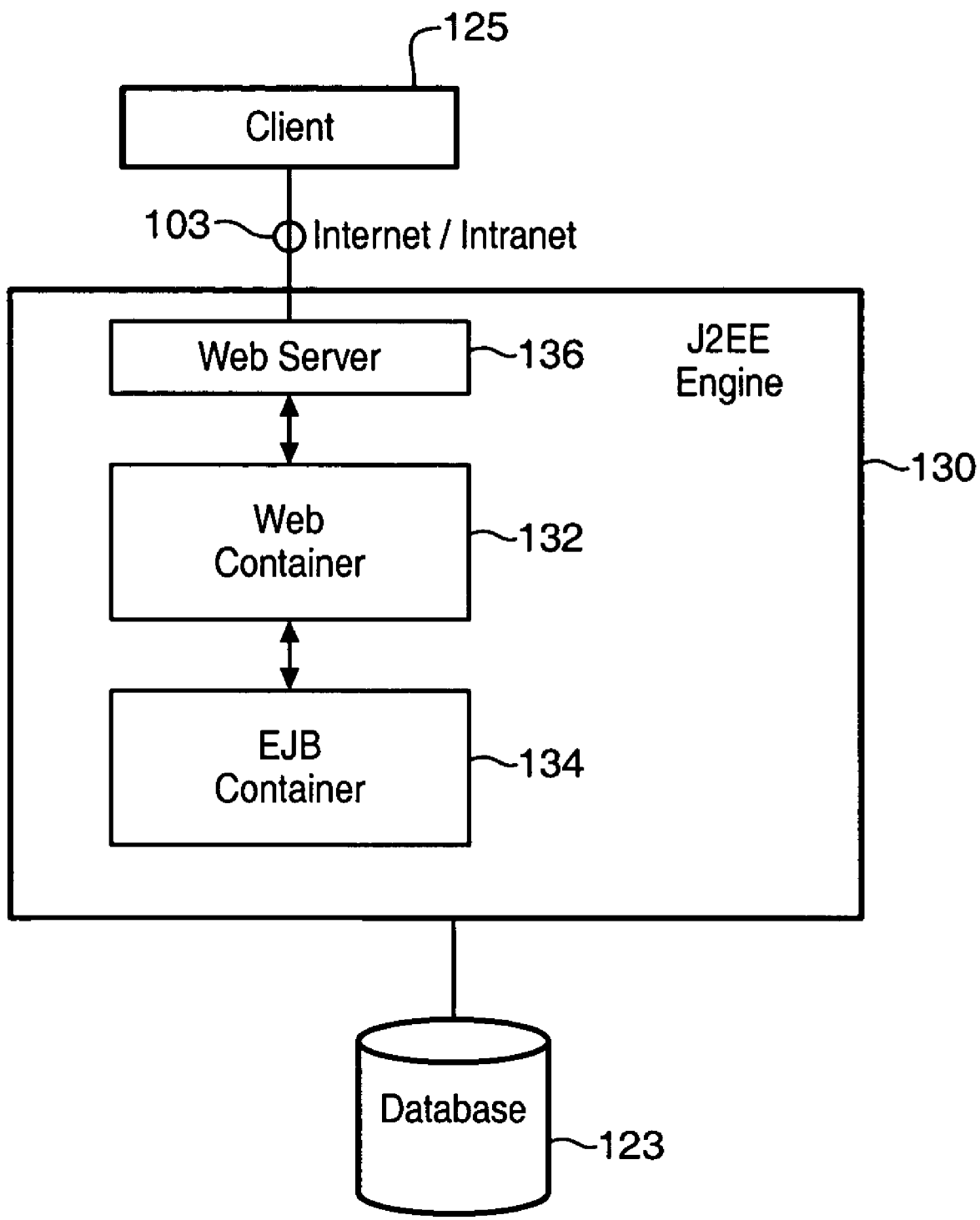
FIG. 1C is a block diagram illustrating a prior art J2EE environment.

Described below is a system and method for updating an application by using a single file update. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
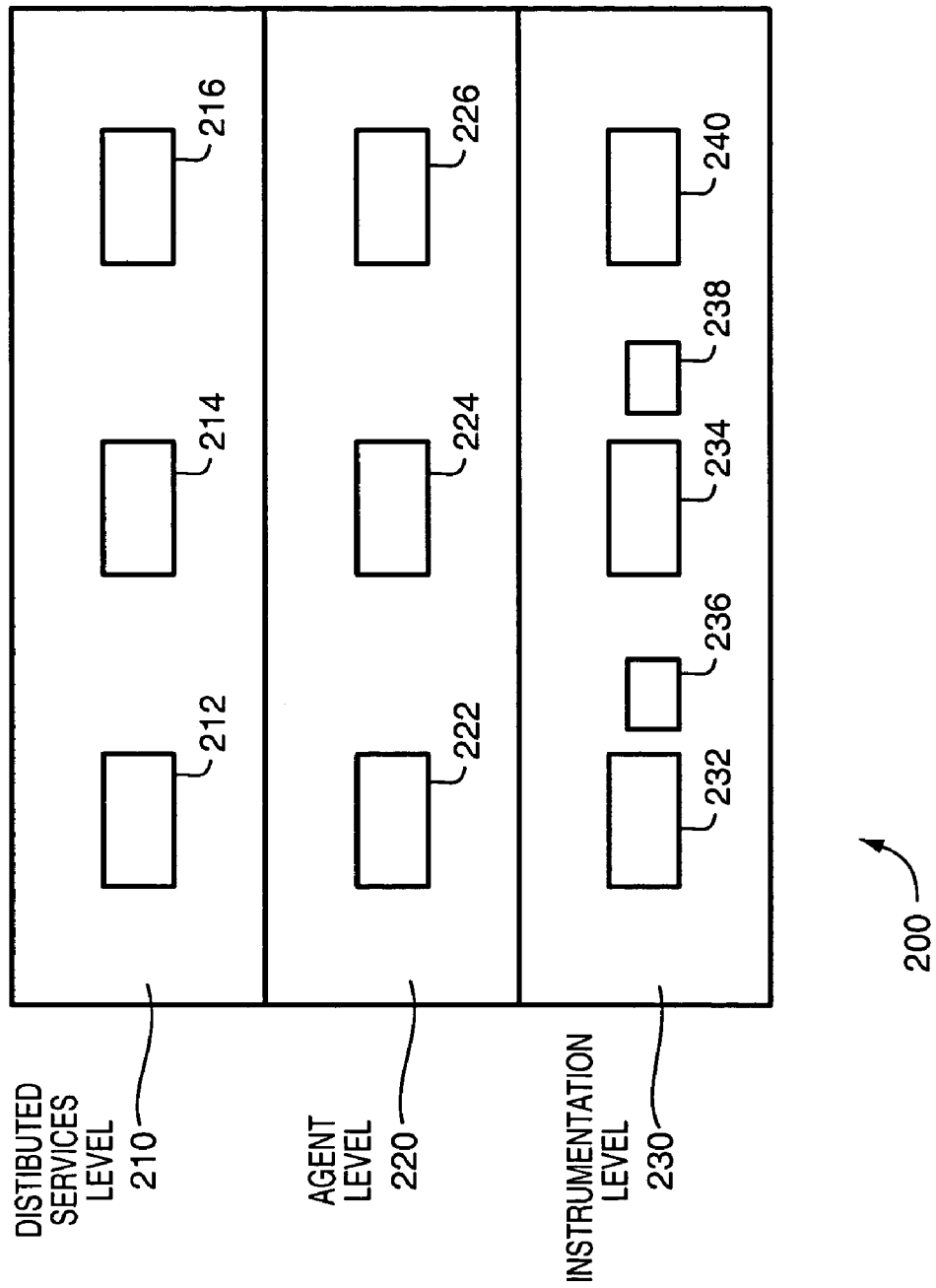
FIG. 2 is a block diagram illustrating an embodiment of Java management architecture (JMA) in which embodiments of the present invention may be implemented.

FIG. 2 is a block diagram illustrating an embodiment of Java management architecture (JMA) 200 in which embodiments of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 11-12. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems (DBMS) 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
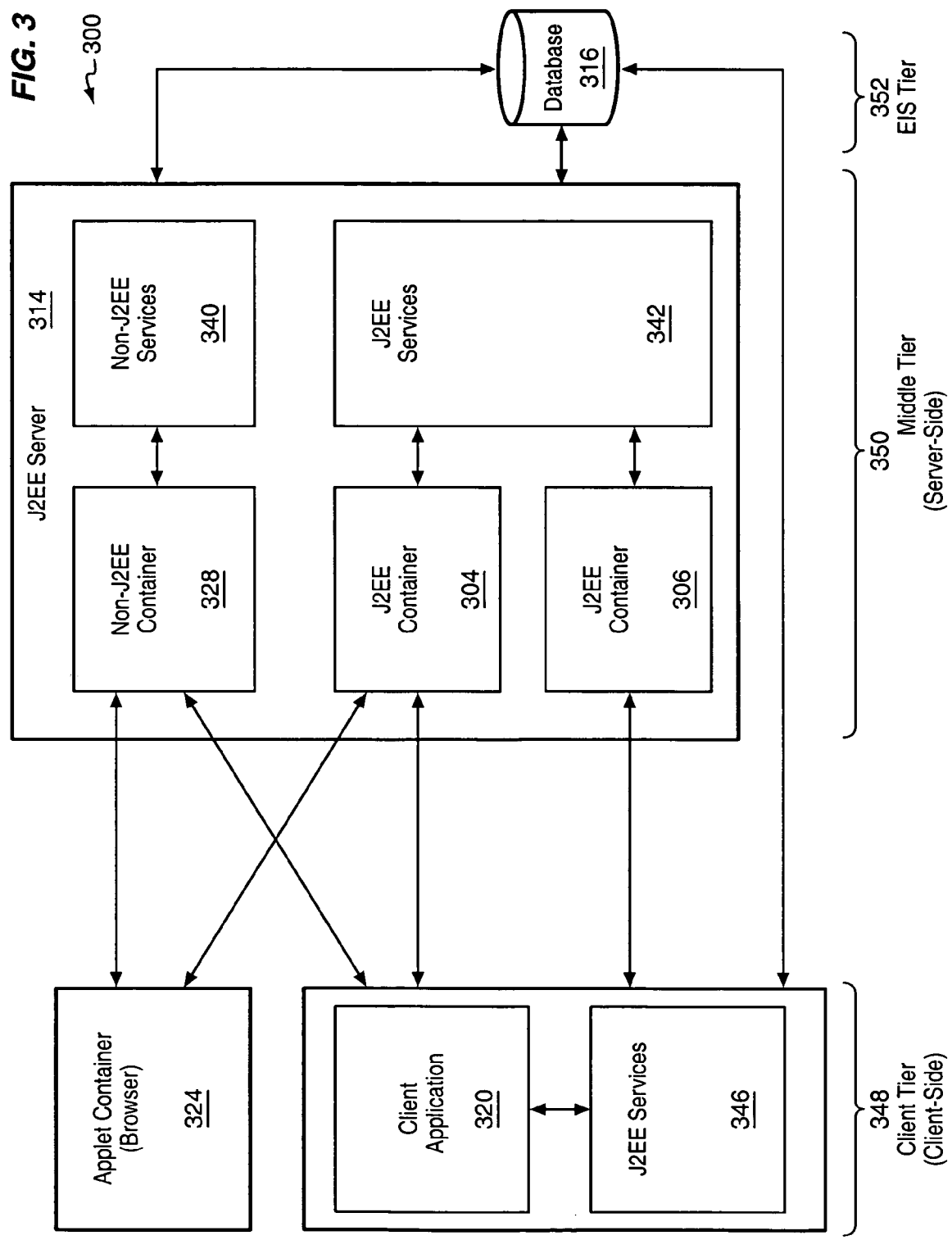
FIG. 3 is a block diagram illustrating an embodiment of a multi-tiered J2EE architecture having a J2EE server employing J2EE and non-J2EE containers and services.

FIG. 3 is a block diagram illustrating an embodiment of a multi-tiered J2EE architecture 300 having a J2EE server 314 employing J2EE and non-J2EE containers 304-306, 328 and services 340-342. As illustrated, the multi-tiered J2EE architecture 300 includes a J2EE server (or engine) 314 having J2EE containers 304-306 on the server-side, and more particularly, in the middle tier 350. The middle tier 350 of the J2EE server (or engine) 314 includes the presentation logic (e.g., Web tier) and business logic (e.g., business tier). Examples of the server-side J2EE containers 304-306 include Web containers and EJB containers. The client tier 348 includes a client application 320 to provide J2EE services 306. The client tier 348 may also include an applet container having a browser 324 to display information.

The J2EE containers 304-306 and the client application 320 are, directly or indirectly, in communication with the database 316, located at the Enterprise Information Systems (EIS) tier 352 of the multi-tiered J2EE architecture 300. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/Common Object Request Broker Architecture (COBRA) written using any programming language (e.g., –C, C, and C++).

The J2EE containers 304-306 in the middle tier 350 are associated with various J2EE services and APIs 342, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS), and dbpool service. The J2EE services 402 further include EJB-_service, servlet_JSP, application_client_service, connector_service to provide (J2EE containers 304-306, namely) EJB containers, Web containers, application client containers, and connector containers, respectively. It is contemplated the client application 320 may also be associated with a set of J2EE services and APIs 346. However, each of the containers 304-306 may be associated with a different set of J2EE services. For example, on the client tier 348, the client application may be associated with different J2EE services 346 than the J2EE containers 304-306 associated with the J2EE services 342 on the server-side 350. Furthermore, the client-side 348 may or may not be J2EE-based.

According to one embodiment, as illustrated, the J2EE server 314 includes a non-J2EE container 328 and a set of non-J2EE services and interfaces 340. An example of a non-J2EE container 328 and non-J2EE services 340 may include an SAP container and a set of SAP services and APIs, respectively. The non-J2EE services 340 include Webdynpro service, log_configurator service, and monitoring service. According to one embodiment, non-J2EE components deployed in the non-J2EE container 328 may be used to assemble non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 340 may include parallel or similar services to the J2EE services 342. The container API may be used to facilitate registration, unregisteration, implementation, and management of not only the J2EE containers 304-306, but also one or more non-J2EE containers 328 on the J2EE server 314. Using a common container API, both the standard J2EE containers 304-306 and the non-J2EE containers 328 may be deployed on the server-side 350, and the J2EE server 3, as whole, regards them as the same. Stated differently, when deploying a non-J2EE container 328, the specific details in the implementation and logic of the non-J2EE container 328 may be kept hidden from the J2EE server 314 so all J2EE and non-J2EE containers 304-306, 328 are to be recognized and regarded the same way as part of the J2EE architecture 300.

The container API, according to one embodiment, is encapsulated in a service 340-342. This is to, for example, expand the J2EE architecture 300 to provide a relatively easy implementation and deployment of services, interfaces, and libraries, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 300 and for enhancing the functionality of the J2EE engine 314 by deploying the non-J2EE containers 328 along with the J2EE containers 304-306. The deploy service may also be used for the deployment of applications, standalone modules (containing both J2EE and non-J2EE components), service, and libraries.

Figure 4:
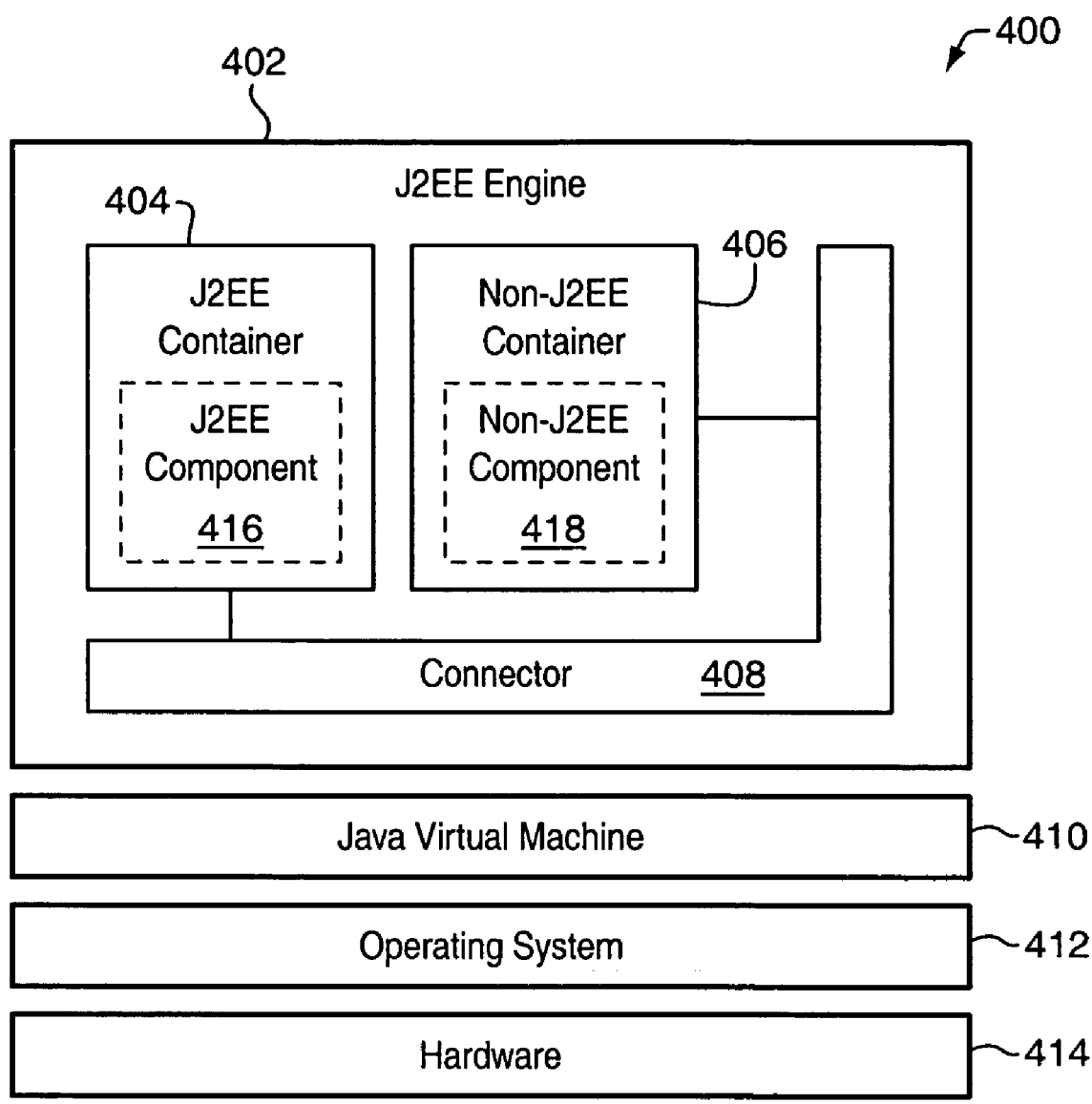
FIG. 4 is a block diagram illustrating a J2EE architecture having J2EE and non-J2EE containers residing on a J2EE engine.

FIG. 4 is a block diagram illustrating a J2EE architecture 400 having J2EE and non-J2EE containers 404-406 residing on a J2EE engine 402. In the illustrated embodiment, the J2EE engine (or server) 402 includes both a J2EE container 404 and a non-J2EE container 406. The J2EE container 404 manages a J2EE component 416, which may be part of a J2EE application. The non-J2EE container 406 manages a non-J2EE component 418, which may be part of a non-J2EE application. The term non-J2EE may refer to a non-J2EE standard element, such as a container 406, component 418, and application and may be synonymous with SAP AG.

The J2EE architecture 400 further includes connectors 408 to provide standard services and APIs to connect the J2EE server 402 and its elements with the rest of the J2EE architecture 400. The connectors 408 may be J2EE or non-J2EE based. The J2EE architecture 400 also includes a JVM 410 to process platform-independent bytecode into platform-specific native code or binary machine code at runtime. The binary machine codes is executed on a hardware 414 using an operating system 412. The operating system 412 may include Microsoft Windows®, Macintosh, Unix, Linux, and the like. The hardware 414 may include a computer processing unit, a storage device, a random access memory, and the like.

Figure 5:
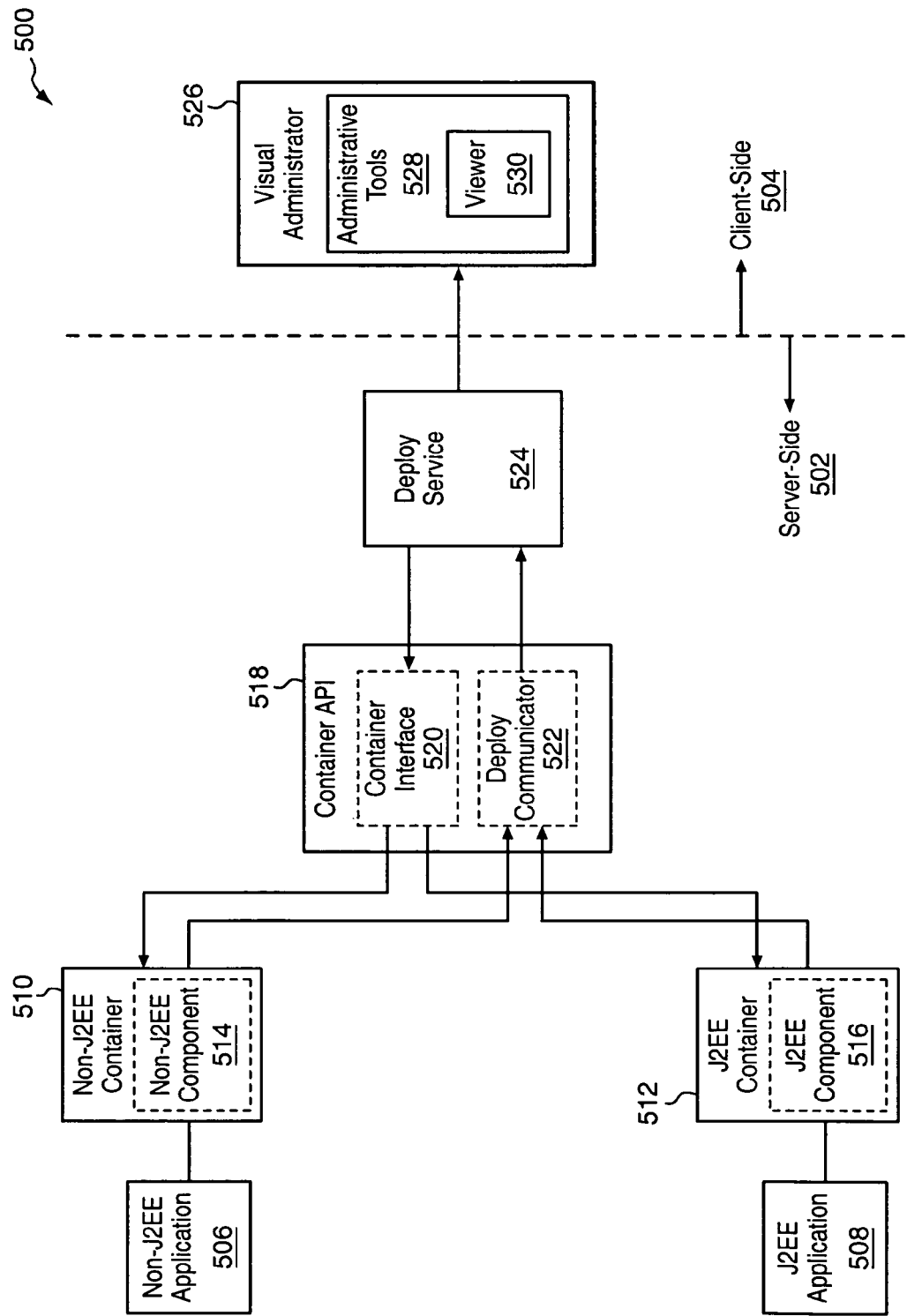
FIG. 5 is a block diagram illustrating a J2EE architecture having a deploy service.

FIG. 5 is a block diagram illustrating a J2EE architecture 500 having a deploy service 524. According to one embodiment, the deploy service 524 serves to extend and enhance the J2EE architecture 500 and its functionalities. The deploy service 524 along with the container API (e.g., SAP container API) 518 help facilitate the deploying of various deployable entities, including J2EE and non-J2EE components 514-516 using J2EE and non-J2EE containers 510-512, respectively. The container API 518 is represented on the server as an interface defined as a development component.

Serving as an entry point for expanding and enhancing the J2EE architecture 500, the deploy service 524 is also used for correct distribution of the deployable entities to their services/containers and a storage place. The storage place is retrieved from configuration manager in the database and the deploy service 524 is to facilitate the storage of all applications so that the containers 510-512 may rely on a consistent storage for the entire application. The application components 514-516 and standalone modules are managed by the containers 510-512, the libraries, services, and interfaces are managed by server's deploy context, which is located at a deeper level in the core of the server because these deployable components are used by applications 506-508 found on a higher level in the J2EE architecture 500. Stated differently, deploy service 524 is used to manage an entire application 506-508, the container 510-512 is used to manage the applications' components 514-516, and the deploy context is used to manage the server components, such as the libraries, services and interfaces. According to one embodiment, the deploy service 524 may obtain the deploy context using its application service context.

According to one embodiment, the container API 518 provides a container interface 520 that is implemented by container services associated with the containers 510-512 (e.g., com.sap.engine.services.deploy-.container.ContainerInterface). Such implementation is to facilitate the deploy service 524 to identify and process various actions on those containers 510-512 that are implemented according to a set of rules including the implementation of the container API 518 by container services. A container service may listen for the availability of the container interface by implementing a container event listener (e.g., com.sap-.engine.frame.container.event.ContainerEventListener).

The container API 518 provides a container management for registration of containers 510-512 by container services when an event indicating the availability of the container API 518 (e.g., <container_api>) is received or listened to by a container service via the container event listener. The container service may then register the container 510-512 using container management. In contrast, when a container 510-512 is rendered not available that container 510-512 is unregistered using the container management (e.g., <com.sap-.engine.services.deploy.container.ContainerManagement>). Stated differently, the contianer services are provided with an opportunity to register their corresponding containers 510-512 with the conatiner API 518 and the deploy service 524 when the continers 510-512 become available and are ready to to perform deployment operations. In contrast, the containers 510-512 may be unregsitered when once they stop or become unavailable.

According to one embodiemnt, the container API 518 also incldues deploy communicator 522 in combination with the container interface 520. The availability of the deploy commnunciator 522 allows the deploy service 524 and the containers 510-512 to communicate bi-directionally. Stated differently, using the container interface 520, the information flows from the deploy service 524 to the containers 510-512. Each of the containers 510-512 may obtain an instance of the deploy communicator 522 during its registration to communicate back with the deploy service 524.

Using the deploy communicator 522, the information may flow from the containers to the deploy service 524. Such information may include information relating to the status, requesting runtime information, initiating operations from containers 510-512, etc., flowing back to the deploy service 524. Such information allows the deploy service 524 to be more efficient by, for exmaple, allowing the containers 510-512 to request to lock the application or changes that may occur due to some property changes in the container 510-512, or by having the deploy service 524 request the changes by update. Another exmaple includes allowing a container 510-512 to stop its deployed applications in the container service stop method, since applications are usually consisting of more than one component and the deploy service 524 may know the entire configuration of an application.

According to one embodiment, the instance of <container info> including information for identification of a container 510-512 may have a set of properties with set/get methods. Some of the properties include: (1) determination of whether a container 510-512 is a J2EE container 512 (e.g., EJB, Web, application, client, resource adapter) or a non-J2EE container 510 (e.g., SAP container); (2) for J2EE containers 512, specification of the type of the components 516 deployed (e.g., String j2eeModuleName); (3) for non-J2EE containers 510, specification of the type of the components 514 deployed (e.g., String moduleName); (4) for specification of the priority of a container 510-512 (e.g., when an application is being deployed, stopped, and started), the deploy service 524 knows in what order to notify the concerned containers 510-512. During deployment and start of an application, the containers 510-512 having higher priority are notified first, and during stop of an application the containers 510-512 with lower priority are first notified (e.g., int priority); (5) specification of a container's unique name (e.g., String name); (6) specification of a set of extensions of files which represents components 514-516 deployed on the respective containers 510-512 (e.g., String [ ] fileExtentions); (7) specification of a set of names of files which represent components 514-516 deployed on the respective containers 510-512 (e.g., String [ ] filenames); (8) specification of the name of the service that provides the container (e.g., String [ ] serviceName); (9) determination of whether the container 510-512 supports the operation "single file update" (e.g., Boolean supportsSingleFileUpdate); and (10) specification of the kind of resource types that are supported by the container (e.g., String [ ] resourceTypes).

According to one embodiment, filenames and extensions may be used by the deploy service 524 for distribution of the deployable deploy components 514-516 on the containers 510-512. The deploy service 524 may include a mechanism for automatic recognition of the container 510-512 to which the corresponding deploying components 514-516 may be distributed, in accordance with the filenames and extensions contained in the <container info> of each of the containers 510-512. For example, if a standalone module file has an extension Web Archive (e.g., WAR or war) and the J2EE Web container has specified this extension in its <container info>, the deploy service 524 may distribute the WAR file to the Web container.

Figure 6:
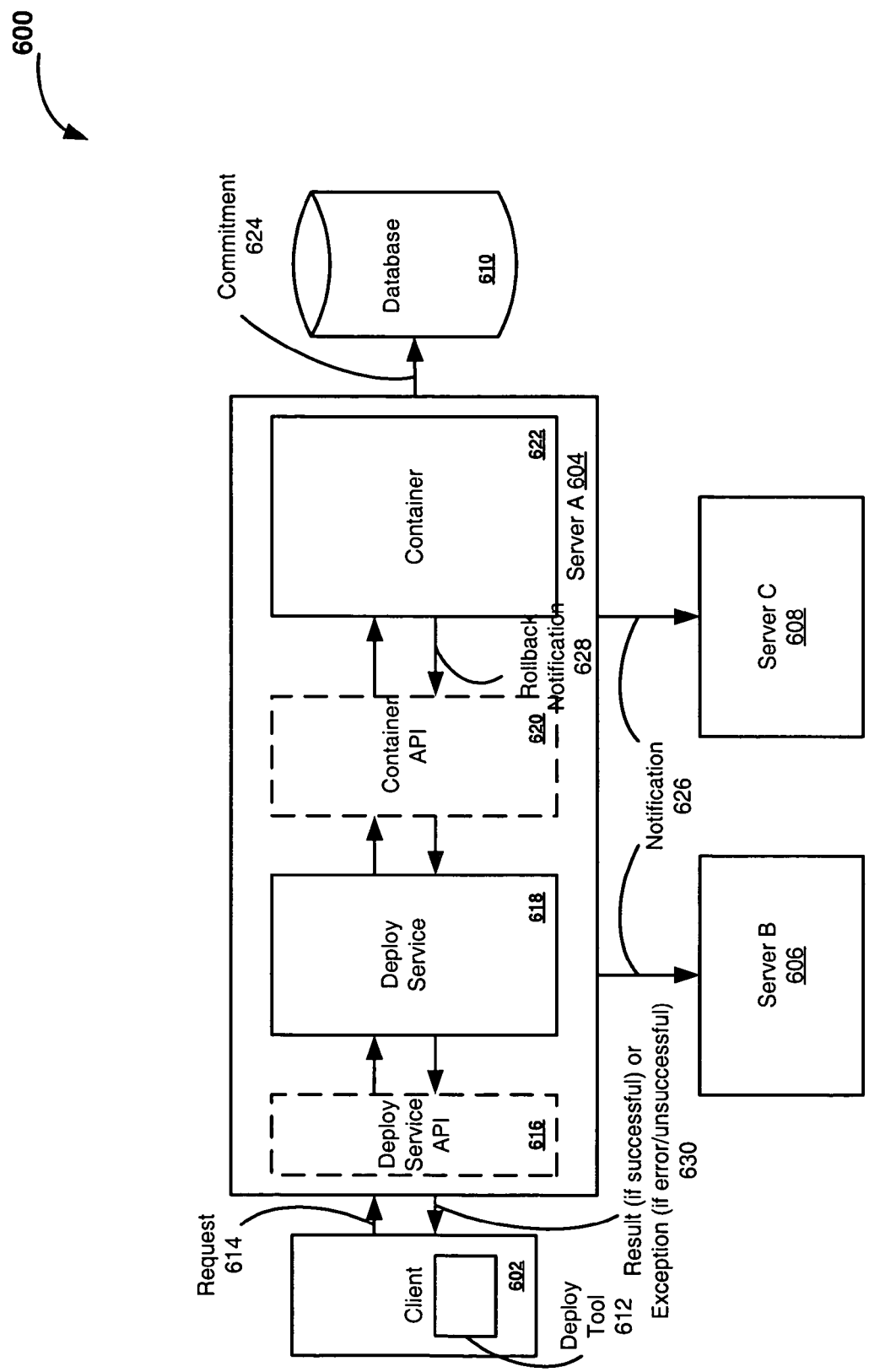
FIG. 6 is a block diagram of an embodiment of a J2EE architecture having a deployment architecture for updating a file to amend an application.

FIG. 6 is a block diagram of an embodiment of a J2EE architecture having a deployment architecture 600 for updating a file to amend an application. In the illustrated embodiment, the deployment architecture 600 includes a client 602 to request 614 the updating one or more files of an already deployed application. In deploying and updating of applications, it is often the case that only a partial updating of the application is needed (e.g., updating a single file of the application) as opposed to updating the entire application. In one embodiment, the updating of a single file of an application is provided. The client 602 (e.g., deployer or administrator on a client system) is used for performing configuration and deploying of various J2EE and non-J2EE modules on a specific product. The deployer or administrator may include a person or a company to configure, deploy, and request execution of applications, administer the computing and networking infrastructure where the applications run, and oversees the runtime environment. Additional duties may include setting transaction controls and security attributes and specifying connections to databases.

In one embodiment, the process of single file update may include removing of the file to be updated from an application, updating of the file, and deploying of the file. In another embodiment, the application is removed for updating the file and after the updating of the file, the application is re-deployed. The process of deployment may include: (1) configuration; (2) distribution; and (3) execution. To perform configuration, the client 602, as a deployer, may follow the assembly instructions provided, for example, by the application assembler and help resolve any external dependencies declared by the application component provider. For distribution, the application archive and the deployment configuration information may be installed on various servers in the clusters via a deployment application programming interface (API). The execution includes making of a request 614 by a client 602 with a deploy service 618 at server A 604 via a deploy service API 616 using a deploy tool 612. The request 614 is for updating one or more files of an already deployed application.

Partially updating an application with specified files from its components is useful during development, because it might not require a full restart of the application. In one embodiment, the updating of an application with specified files from the components of the application is used in cases when the changes are minimal (e.g., changes in only a few files) and it may not be necessary to rebuild the entire Enterprise ARchive (e.g., EAR or ear) file. According to one embodiment, a transaction scheme for updating a single file may include receiving a request 614 at a deploy service 618 via a deploy service API 616 from a client 602. In response to the request 614, the deploy service 618 communicates with the container 622 via a container API 620 to update the file. The update to the file is made at the container 622 working with the deploy service 618. Once the update is made, the transaction relating to the successful updating the single file is committed 624 to the database 610. Once the transaction is committed 624 to the database 610, the deploy service 618 at server A 604 notifies 626 other servers B and C 606-608 in the cluster of the successful updating of the file and application. The other servers B and C 606-608 may then update information (e.g., the application) at servers B and C 606-608, in accordance with the contents and status of the updated application, by accessing the updated information on the database 610.

In one embodiment, the deploy service API 616 and the container API 620 invoke certain methods to facilitate the updating of one or more files of an application using the deploy service 618 and the container 622. The deploy service API 616 may use the following methods: (1) <public void singleFileUpdate(FileUpdateInfo[ ] files, String appName, Properties props) throws java.rmi.RemoteException>; and, (2) <public void singleFileUpdate(FileUpdateInfo[ ] files, String providerName, String appName, Properties props) throws java.rmi.RemoteException>.

The container API 620, according to one embodiemnt, may use the following six methods: (1) <public boolean needStopOnSingleFileUpdate(FileUpdateInfo[ ] files, ContainerDeploymentInfo dInfo, Properties props) throws DeploymentException, WarningException> (method one); (2)<public ApplicationDeployInfo makeSingleFileUpdate(FileUpdateInfo[ ] files, ContainerDeploymentInfo dInfo, Properties props) throws DeploymentException> (method two); (3)<public void prepareSingleFileUpdate(String applicationName) throws DeploymentException, WarningException> (method theree); (4) <public ApplicationDeployInfo commitSingleFileUpdate(String applicationName) throws WarningException> (method four); (5)<public void rollbackSingleFileUpdate(String applicationName, Configuration config) throws WarningException> (method five); and, (6) <public void notifySingleFileUpdate(String applicationName, Configuration config, Properties props) throws WarningException> (method six).

Method one checks to verify whether the application needs to be restarted to updated its one or more specified files. The parameter used may include "files" for holding the information about the files that are to be updated and "dinfo" may function as <containerdeploymentinfo> during the deployment and "props" may represent properties holding information necessary for the process of update the file. The properties may be unlimited and specific for each container 622. A true signal is returned if one of the files to be updated is such that it may be necessary or desirable to stop the application before the performing of the update. A false signal is returned if the stopping of the application is not necessary or desirable. If the application is stopped, it may be automatically started after the update process.

For method one, the exceptions may include deployment exception (e.g., <DeploymentException>) and warning exception (e.g., <WarningException>). The deployment exception is triggers if one or more errors occur during a check of the file to be update or when an update could not be performed for the selected file. At deployment exception, the process is stopped. The warning exception is triggered when an error of little importance occurs during the check. The process may continue despite the exception.

Method two, in one embodiment, facilitates the performing of the update of a single file of the application on the container 622. The parameters are the same as for method one. Information returns about application components needed for the deploy service and provided from the container 622—the same as the returned result of during deployment. A deployment exception is thrown if an error occurs during the check or if the update could not be performed for the selected files. In case of the deployment exception, the deploy operation is rolled back. On all corresponding containers 622 that have gone through <makeSingleFileUpdate( ) rollbackSingleFileUpdate( )> is invoked to notify the failure of the operation.

Method three is regarded as the prepare (or preparation) step of the update procedure where the application integrity is checked. This may be the last method to cause unsuccessful update of the selected files and rolling back of the deploy operation, because once a transaction is committed 624, it may not be rolled back to its previous step. The parameter used may include the name of the updated application. A deployment exception may be thrown if an error occurs during the check or if the update of the selected file could not be performed. If the deploy exception is triggered, the deploy operation may be rolled back. On all corresponding containers 622 that have gone through <makeSingleFileUpdate( ), rollbackSingleFileUpdate( )> is invoked to notify the failure of the operation. The warning exception is thrown if an error of little importance occurs during the check. The process may continue despite the warning exception.

Method four facilitates providing a confirmation about the successful completion of the updating of the single file. The updating of the file includes successful completion of the updating of the components from the application, and the initiation and availability of the components for use. The only parameter used may be the name of updated application. The information return may be provided about the application components needed for the deploy service 618 and provided from the container 622. The status for the application components may be regarded as final and committed 624 to the database 610. A warning exception may be thrown if an error of little importance occurs during the update of the file; however, the process may still be regarded as successful.

Method five relates to providing the rollback notification 628 regarding the failure of the updating of the specified file. The failure in updating the file (e.g., failure in updating the application or components) may occur at the makeSingleFileUpdate or the prepareSingleFileUpdate phase, at which point, and in response to the failure, the application may revert back (e.g., roll back) to its previous state. In one embodiment, the updating of the file may not fail or be unsuccessful once it is committed 624 to the database 610. The parameters for method five may include application name representing the name of the application to be updated and configuration representing the configuration of the application and opened for WRITE access. A warning exception may be thrown if an error of little importance occurs during the rollback. The rollback refers to the rolling back of the file updating process or of a deploy operation when an error or exception has occurred. In case of a rollback, the client 602 receives an exception 630 from the server A 604.

Once the updating of the file is (successfully) completed and committed 624 to the database 610, using method six, other servers B and C 606-608 in the cluster are notified of the changes to the application. The client 602 is then notified of the completion and that the request 614 has been fulfilled. The parameters used for method six are application name representing the name of the updated application and configuration representing the configuration for the application and opened for READ access. The parameters may also include props represnting properties holding information necessary for the process of performing the update of the file. The properties may be unlimited and specific for each container 622. A warning exception may be thrown if an error of little importance occurs during the update process.

Figure 7:
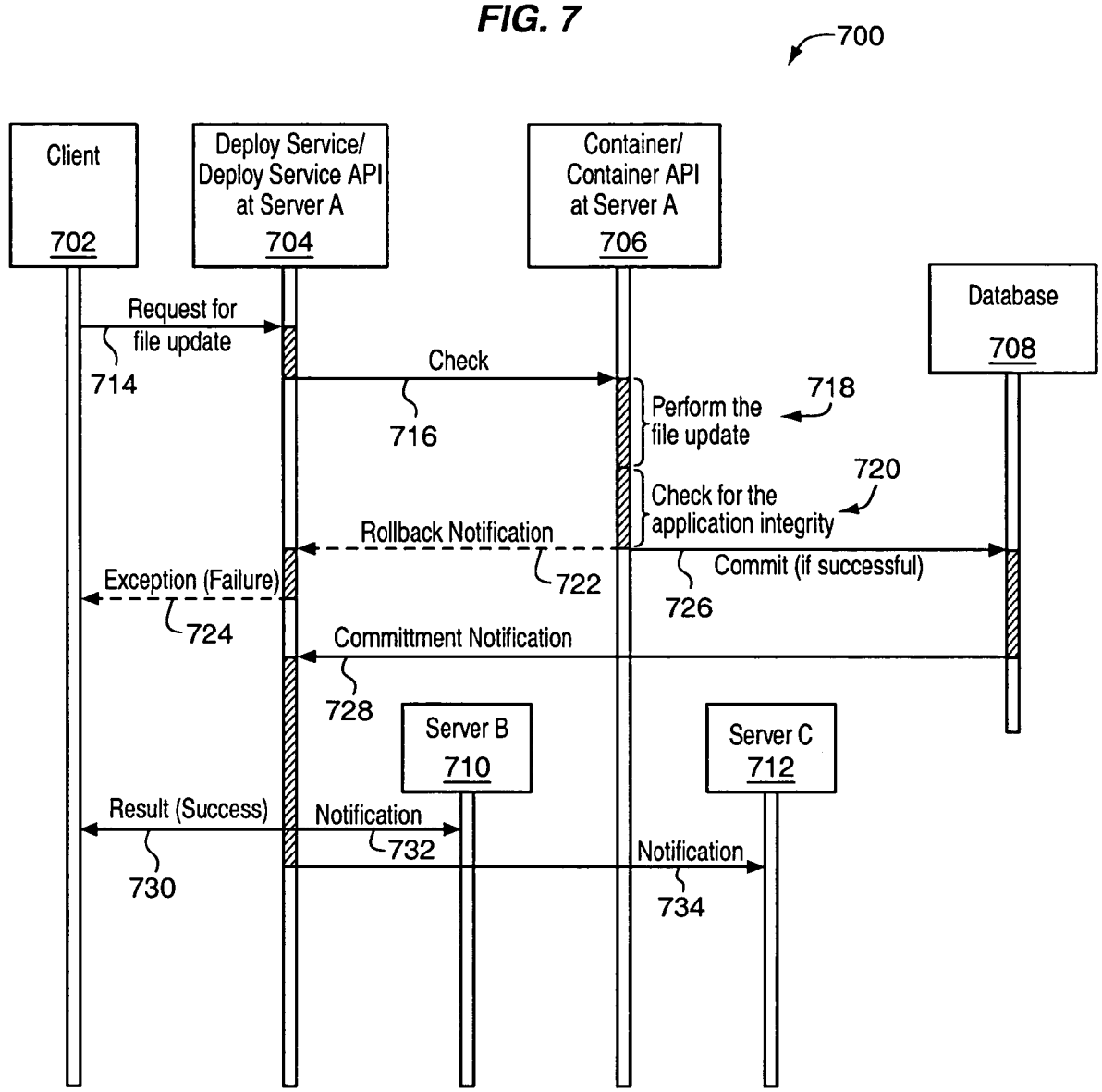
FIG. 7 is a block diagram illustrating an embodiment of an information transmission sequence for amending an application by updating a single file using a deploy architecture.

FIG. 7 is a block diagram illustrating an embodiment of an information transmission sequence for amending an application by updating a single file using a deploy architecture 700. In one embodiment, a client 702 places a request 714 for amending an application by updating one or more files of that application. The deploy service via a deploy service API at server A 704 performs a check 716 on the application to determine whether the application is needed to be restarted for the update purposes. If yes, the stop of application is performed prior to updating the specified files. In this case the application is started automatically after finishing of updating process. If restart is not needed (or after stopping), the file update is performed 718 at the container via a container API at server A 706. At the end of the update process, a check 720 is performed to verify the integrity of the application to be updated.

In case of a failure of file update 718 or of application integrity during the check 720, the transaction may be rolled back to its previous state. A notification 722 regarding the rollback is then submitted to the deploy service at server A 704 to be forwarded as an exception 724 to the client 702. If, however, the file update 718 is completed and the check 720 is successfully performed, the transaction is committed 726 to the database 708. A notification 728 regarding the commitment is then sent to the deploy service at server A 704. Once the notification 728 is received (or once the deploy service at server A 704 becomes aware of the commitment 726), a result 730 is compiled and forwarded to the client 702. The deploy service at server A 704 also provides notification 732-734 of the commitment to other servers B and C 710-712 in the cluster. The notification 732-734 of the commitment includes informing the servers B and C 710-712 of the updating of the application so that the servers B and C 710-712 may access the updated information from the database 708 to synchronize the information on the servers B and C 710-712 with the update information on the database 708.

Figure 8:
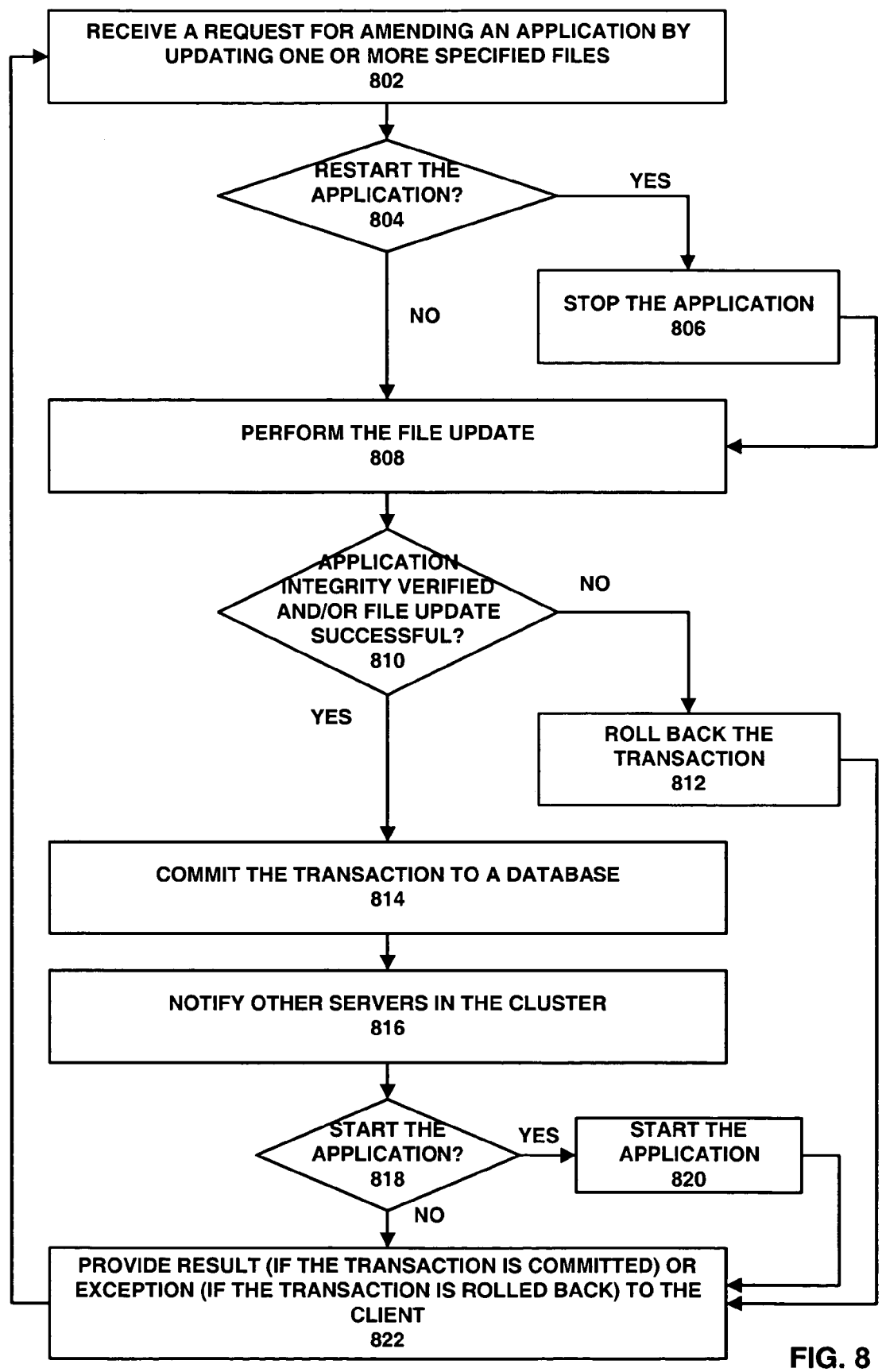
FIG. 8 is flow diagram illustrating an embodiment of a process for amending an application by updating one or more files of the application.

FIG. 8 is flow diagram illustrating an embodiment of a process for amending an application by updating one or more files of the application. First, a client requests amending an application by updating a specified file of the application at processing block 802. The request for updating one or more specified files may be performed using a deploy tool on the client. At decision block 804, the deploy service at the server, receiving the request via a deploy service API, determines whether the application to be amended needs to be restarted. If the restart of the application is needed, the application is stopped at processing block 806. If the restart of the application is not needed or if the stop has already been completed, the file update is performed at processing block 808.

At decision block 810, a determination is made as to whether the file update has been successfully completed and/or the application integrity is up to the specified or acceptable level of integrity required or needed. In case of a failure with regard to the file update or if the application integrity is below the expected level of integrity, the transaction for updating the file is rolled back to its previous state at processing block 812. On the other hand, if the file update is performed successfully and the application integrity is satisfactory, the transaction is committed to a database at processing block 814. Once the transaction is committed, the server, where the transaction was performed, provides notification of the commitment to other servers present in the cluster at processing block 816. By providing the notification, other servers become aware of the changes in the application by accessing the amended application or related information on the database and use that information to synchronize the applications stored on the other servers with the amended application on the database.

At processing block 818, a determination is made as to whether the application needs a start. The application may need a start if it was previously stopped at processing block 806. If the start is needed, the application is started at processing block 820. If the start is not needed (e.g., the application was not stopped before update at processing block 806), the process may continue at processing block 822. At processing block 822, a result or exception is then provided to the client to complete the process by fulfilling the client's request. The result is provided if the transaction is committed to the database (e.g., file update is successfully completed). The exception is provided if the transaction is not committed to the database (e.g., the file update fails due to an error or lack or proper integrity). The client may receive the result and/or exception using various administrative tools, including the deploy tool, and may view the information using a viewer including a GUI-based or Web-based viewer.

Figure 9A:
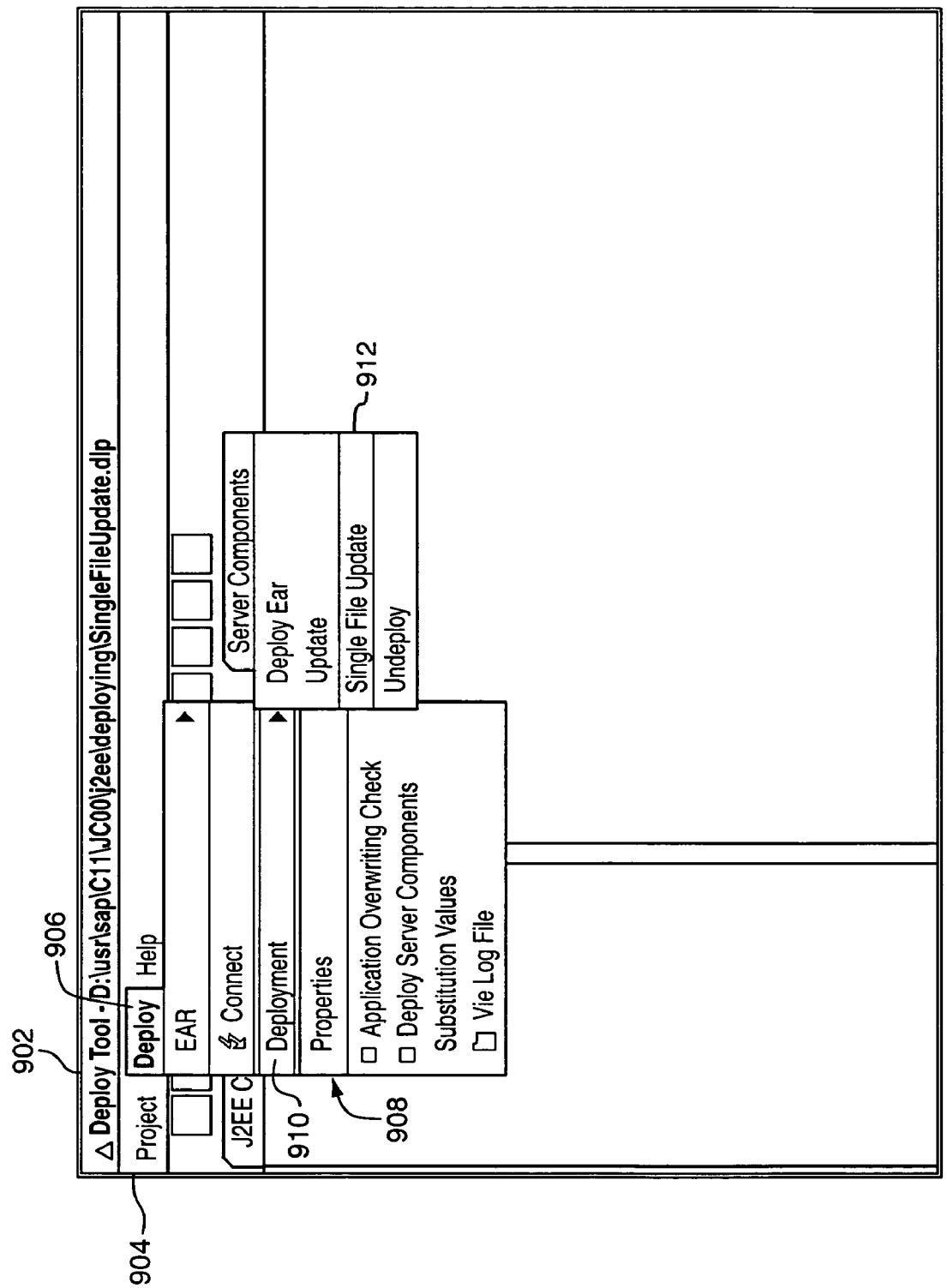
FIG. 9A is an exemplary illustration of an embodiment of using a deploy tool on a client for single file update.

FIG. 9A is an exemplary illustration of an embodiment of using a deploy tool 902 on a client for single file update. As illustrated, the deploy tool 902 contains a menu 904 with options/items including deploy 906. When deploy 906 is selected, it provides a drop down menu 908 for a user to select from various options. One of the options on the drop down menu 908 is deployment 910. By selecting deployment 910, the user may select the option of single file update 912 to start updating a specified file by specifying the file name in another window, called the single file update, as illustrated in FIG. 9B.

Figure 9B:
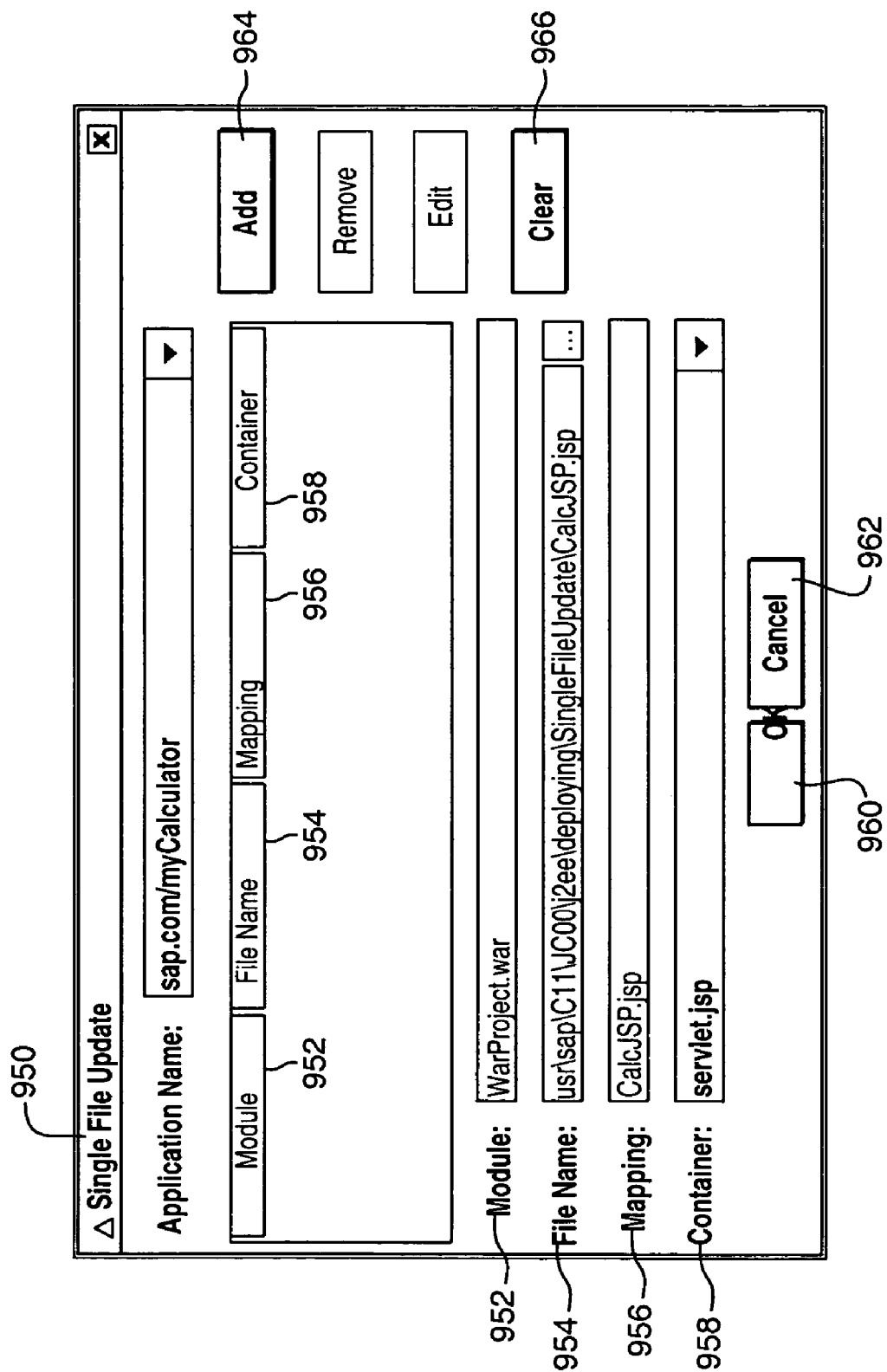
FIG. 9B is an exemplary illustration of an embodiment of using a deploy tool on a client for single file update

FIG. 9B is an exemplary illustration of an embodiment of using a deploy tool on a client for single file update. The selection of deployment 910 (FIG. 9A) may result in opening of another window, called the single file update 950. The single file update 950 allows the user to input appropriate information to specify the single file to be updated. For example, user may include information relating to module 952, file name 954, mapping 956, and container 958. By selecting OK 960, the user may request and start the process for updating the specified file. By selecting cancel 962, the user may close single file update 950 and choose not to go through with the process. Furthermore, the user may select add 964 to add additional files by providing additional information 952-958 for the additional files. Also, by selecting clear 966, the user may clear any of the files he chooses not to update.

Figure 10:
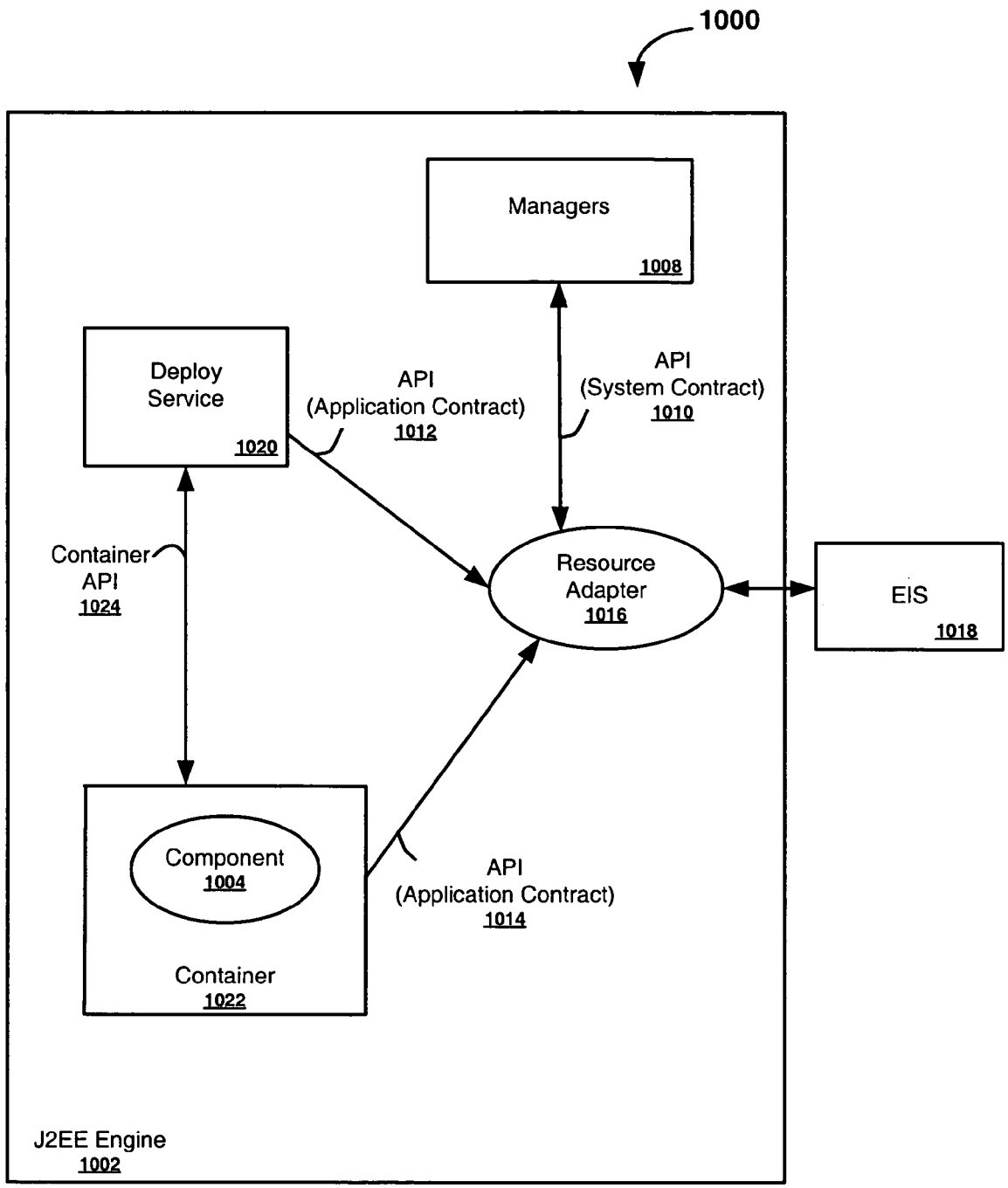
FIG. 10 is a block diagram illustrating an embodiment of a J2EE connector architecture including a deploy service.

FIG. 10 is a block diagram illustrating an embodiment of a J2EE connector architecture 1000 including a deploy service 1020. In the illustrated embodiment, the J2EE architecture 1000 enables application components 1004, including J2EE and non-J2EE components, to interact with an enterprise information system (EIS) 1018. Similarly, the J2EE and non-J2EE applications communicate with the EIS 1018 via the resource adapter 1016. The EIS software associated with the EIS 1018 may include various systems, enterprise resource planning (ERP), mainframe transaction processing, and databases. The EIS 1018 includes back-end database or data management components that run on the database server. The EIS 1018 may include persistent storages or databases, database servers, EJB servers, old systems, mySAP components, and the like. It is contemplated, not all components 1004 are required to have access to the EIS 1018.

As illustrated, the J2EE connector architecture 1000 includes a resource adapter 1016, also referred to as a component, to provide connectivity to a specific EIS or EIS system 1018. The resource adapters 1016 are provided by various EIS vendors. The J2EE connector architecture 1000 may also include various J2EE or non-J2EE products to allow the resources adapters 1016 to be plugged in to the platform implementation. A resource adapter 1016 may be stored in a Resource Adapter Archive (RAR) file and deployed on a J2EE server, similar to an EAR file of a J2EE application. Also, the RAR file may be contained in an EAR file or it may exist as a separate file.

According to one embodiment, a deploy service 1020 communicates with various containers 1022, each having application components 1004, via a container API 1024. The deploy service 1020 facilitates the management of the container 1022 and of the application assembled using the application component 1004. The deploy service 1020 and the container 1022 communicate with the resource adapter 1016 via application contracts or APIs 1012-1014. The resource adapter 1016 is then used by the deploy service 1020 and the container 1022 to communicate with the EIS 1018. Similarly, the mangers or services 1008 are linked with the resource adapter 1016 via an API or services contract 1010 to link the EIS 1018 with various services, such as security, transaction, and connectivity, managed by the server. The APIs 1010-1014 are implemented by the resource adapter 1016.

Figure 11:
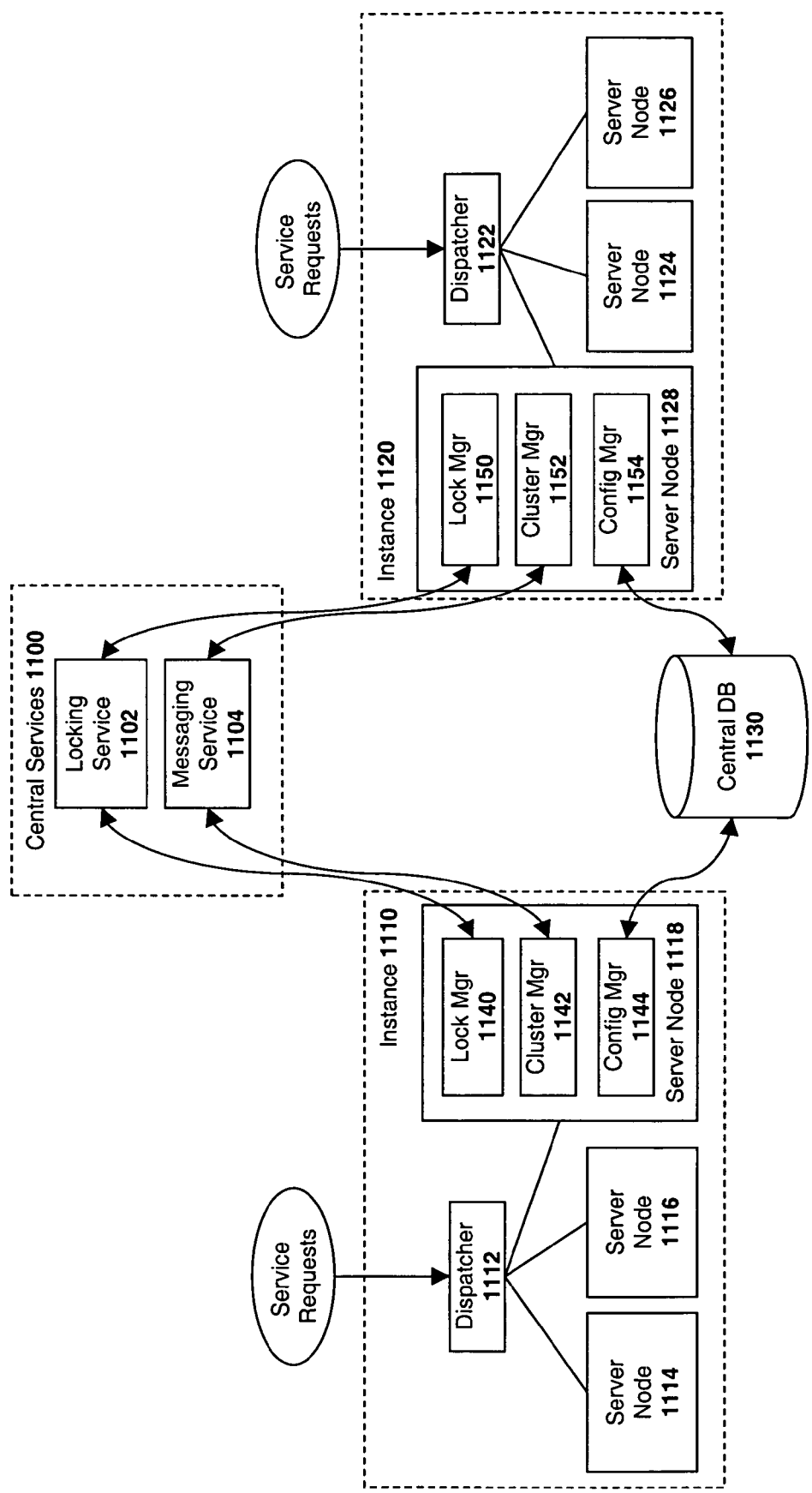
FIG. 11 is a block diagram illustrating an embodiment of a server node system architecture.

A system architecture according to one embodiment of the invention is illustrated in FIG. 11. The architecture includes a central services instance 1100 and a plurality of application server instances 1110, 1120. As used herein, the application server instances, 1110 and 1120, each include a group of server nodes 1114, 1116, 1118 and 1124, 1126, 1128, respectively, and a dispatcher, 1112, 1122, respectively. The central services instance 1100 includes a locking service 1102 and a messaging service 1104 (described below). The combination of all of the application server instances 1110, 1120 and the central services instance 1100 is referred to herein as a "cluster." Although the following description will focus solely on instance 1110 for the purpose of explanation, the same principles apply to other instances such as instance 1120.

The server nodes 1114, 1116, 1118 within instance 1110 provide the business and/or presentation logic for the network applications supported by the system. Each of the server nodes 1114, 1116, 1118 within a particular instance 1110 may be configured with a redundant set of application logic and associated data. In one embodiment, the dispatcher 1110 distributes service requests from clients to one or more of the server nodes 1114, 1116, 1118 based on the load on each of the servers. For example, in one embodiment, the dispatcher 1110 implements a round-robin policy of distributing service requests.

The server nodes 1114, 1116, 1118 may be Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft NET platforms and/or the Advanced Business Application Programming ("ABAP") platforms developed by SAP AG, the assignee of the present application.

In one embodiment, communication and synchronization between each of the instances 1110, 1120 is enabled via the central services instance 1100. As illustrated in FIG. 11, the central services instance 1100 includes a messaging service 1104 and a locking service 1102. The message service 1104 allows each of the servers within each of the instances to communicate with one another via a message passing protocol. For example, messages from one server may be broadcast to all other servers within the cluster via the messaging service 1104 (e.g., such as the cache configuration messages described below). Alternatively, messages may be addressed directly to specific servers within the cluster (i.e., rather than being broadcast to all servers).

In one embodiment, the locking service 1102 disables access to (i.e., locks) certain specified portions of configuration data and/or program code stored within a central database 1130 or resources shared in the cluster by different services. The locking manager locks data on behalf of various system components which need to synchronize access to specific types of data and program code (e.g., such as the configuration managers 1144, 1154). As described in detail below, the locking service enables a distributed caching architecture for caching copies of server/dispatcher configuration data.

In one embodiment, the messaging service 1104 and the locking service 1102 are each implemented on dedicated servers. However, the messaging service 1104 and the locking service 1102 may be implemented on a single server or across multiple servers while still complying with the underlying principles of the invention.

As illustrated in FIG. 11, each server node (e.g., 1118, 1128) includes a lock manager 1140, 1150 for communicating with the locking service 1102; a cluster manager 1142, 1152 for communicating with the messaging service 1104; and a configuration manager 1144, 1154 for communicating with a central database 1130 (e.g., to store/retrieve configuration data as described herein). Although the lock manager 1140, 1150, cluster manager 1142, 1152 and configuration manager 1144, 1154 are illustrated only with respect to server nodes 1118 and 1128 in FIG. 11, each of the server nodes 1114, 1116, 1124 and 1126 and/or on the dispatchers 1112, 1122 may be equipped with equivalent lock managers, cluster managers and configuration managers while still complying with the underlying principles of the invention.

Figure 12:
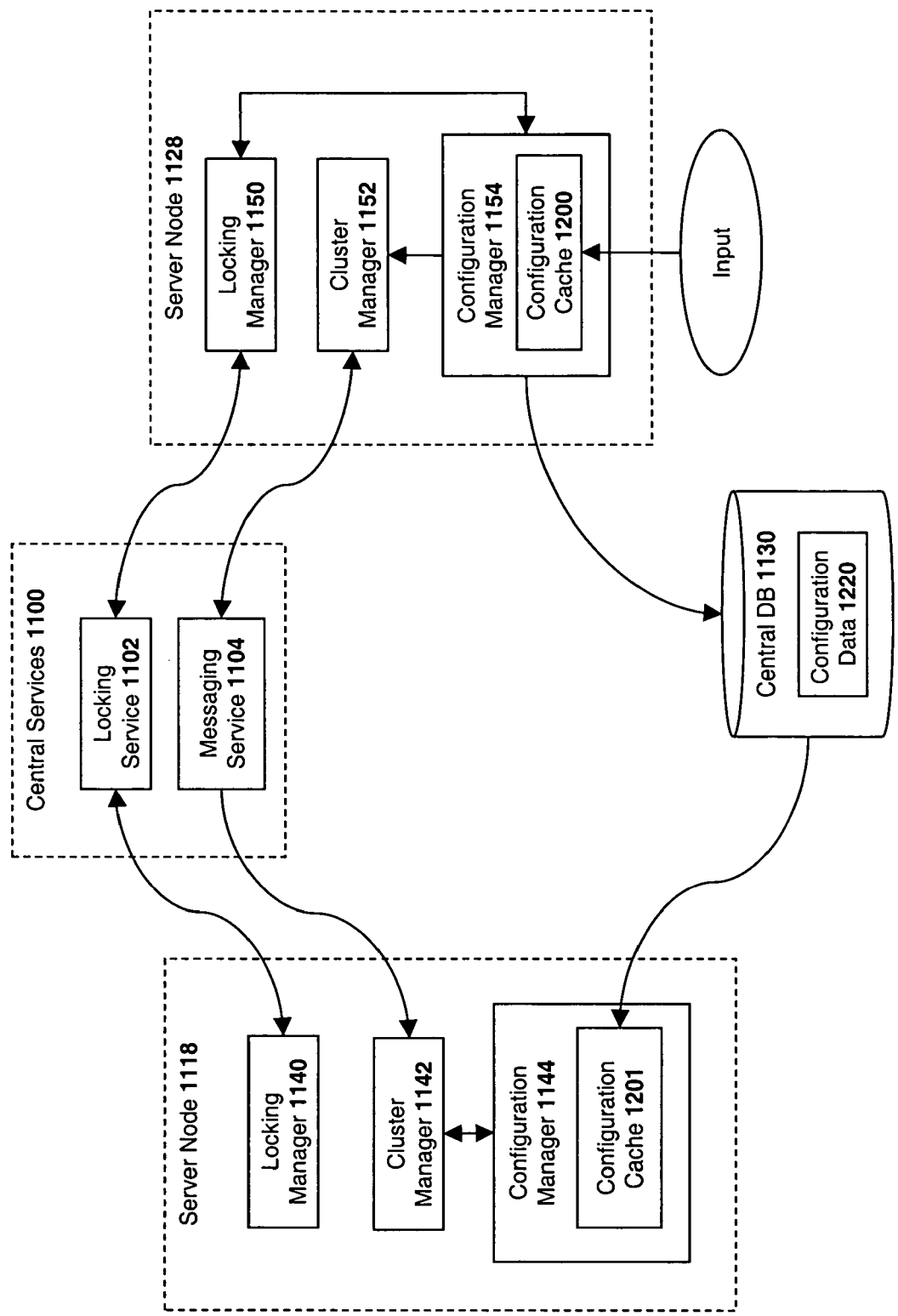
FIG. 12 is a block diagram illustrating an embodiment of a server node architecture which employs a configuration data caching.

Referring now to FIG. 12, in one embodiment, configuration data 1220 defining the configuration of the central services instance 1100 and/or the server nodes and dispatchers within instances 1110 and 1120, is stored within the central database 1130. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1144, 1154 cache configuration data locally within configuration caches 1200, 1201. As such, to ensure that the configuration data within the configuration caches 1200, 1201 remains up-to-date, the configuration managers 1144, 1154 implement cache synchronization policies, as described herein.

Figure 13:
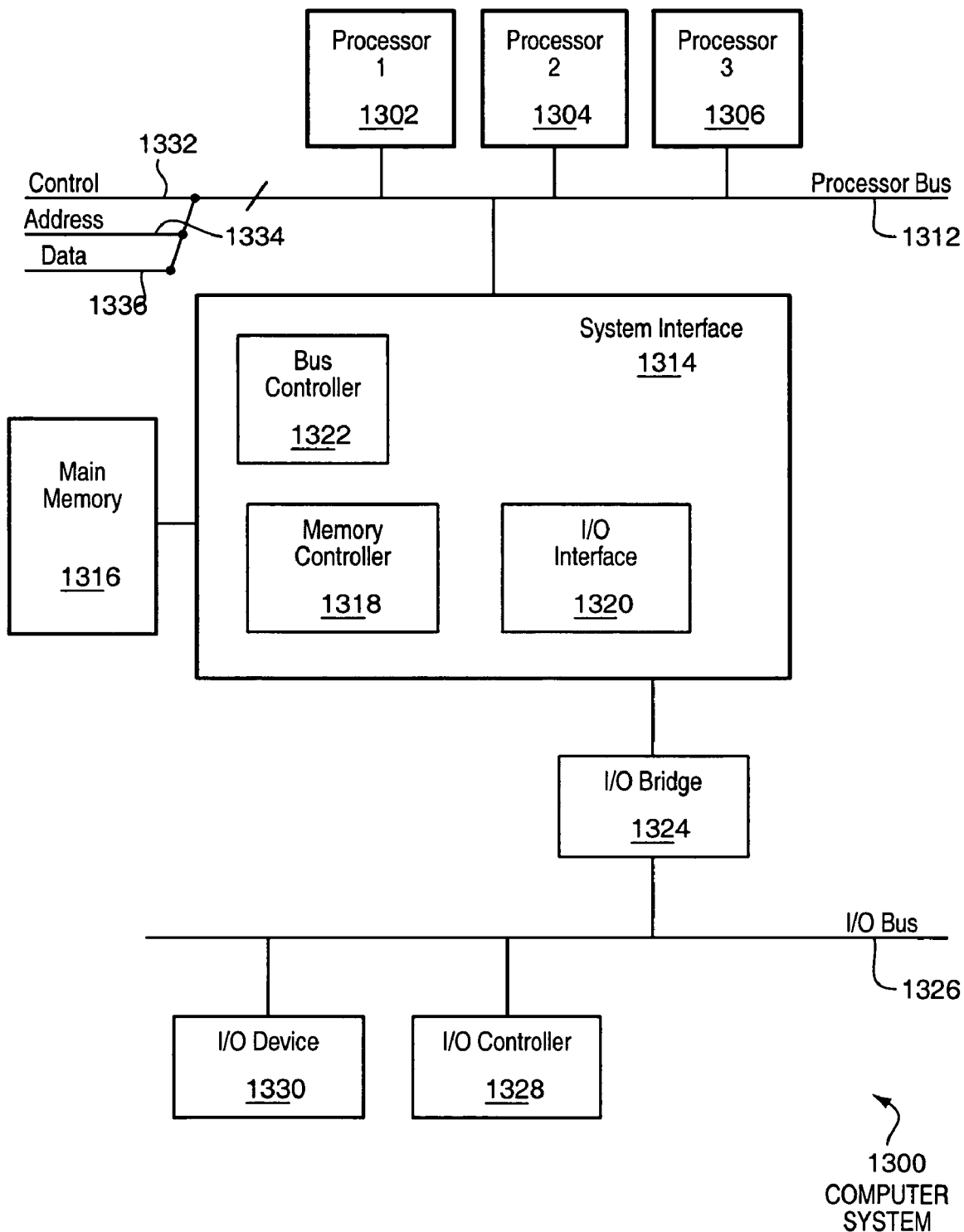
FIG. 13 is an exemplary computer system used in implementing an embodiment of the present invention.

FIG. 13 is an exemplary computer system 1300 used in implementing an embodiment of the present invention. The computer system (system) 1300 includes one or more processors 1302-1306. The processors 1302-1306 may include one or more single-threaded or multi-threaded processors. A typical multi-threaded processor may include multiple threads or logical processors, and may be capable of processing multiple instruction sequences concurrently using its multiple threads. Processors 1302-1306 may also include one or more internal levels of cache (not shown) and a bus controller or bus interface unit to direct interaction with the processor bus 1312.

Processor bus 1312, also known as the host bus or the front side bus, may be used to couple the processors 1302-1306 with the system interface 1314. Processor bus 1312 may include a control bus 1332, an address bus 1334, and a data bus 1336. The control bus 1332, the address bus 1334, and the data bus 1336 may be multidrop bi-directional buses, e.g., connected to three or more bus agents, as opposed to a point-to-point bus, which may be connected only between two bus agents.

System interface 1314 (or chipset) may be connected to the processor bus 1312 to interface other components of the system 1300 with the processor bus 1312. For example, system interface 1314 may include a memory controller 1318 for interfacing a main memory 1316 with the processor bus 1312. The main memory 1316 typically includes one or more memory cards and a control circuit (not shown). System interface 1314 may also include an input/output (I/O) interface 1320 to interface one or more I/O bridges or I/O devices with the processor bus 1312. For example, as illustrated, the I/O interface 1320 may interface an I/O bridge 1324 with the processor bus 1312. I/O bridge 1324 may operate as a bus bridge to interface between the system interface 1314 and an I/O bus 1326. One or more I/O controllers and/or I/O devices may be connected with the I/O bus 1326, such as I/O controller 1328 and I/O device 1330, as illustrated. I/O bus 1326 may include a peripheral component interconnect (PCI) bus or other type of I/O bus.

System 1300 may include a dynamic storage device, referred to as main memory 1316, a RAM, or other devices coupled to the processor bus 1312 for storing information and instructions to be executed by the processors 1302-1306. Main memory 1316 also may be used for storing temporary variables or other intermediate information during execution of instructions by the processors 1302-1306. System 1300 may include a ROM and/or other static storage device coupled to the I/O bus 1326 for storing static information and instructions for the processors 1302-1306.

Main memory 1316 or dynamic storage device may include a magnetic disk or an optical disc for storing information and instructions. I/O device 1330 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1330 may also include an input device (not shown), such as an alphanumeric input device, including alphanumeric and other keys for communicating information and/or command selections to the processors 1302-1306. Another type of user input device includes cursor control, such as a mouse, a trackball, or cursor direction keys for communicating direction information and command selections to the processors 1302-1306 and for controlling cursor movement on the display device.

System 1300 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1300 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 1300 may vary from implementation to implementation depending upon numerous factors, such as price constraints, performance requirements, technological improvements, and/or other circumstances.

It should be noted that, while the embodiments described herein may be performed under the control of a programmed processor, such as processors 1302-1306, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 14:
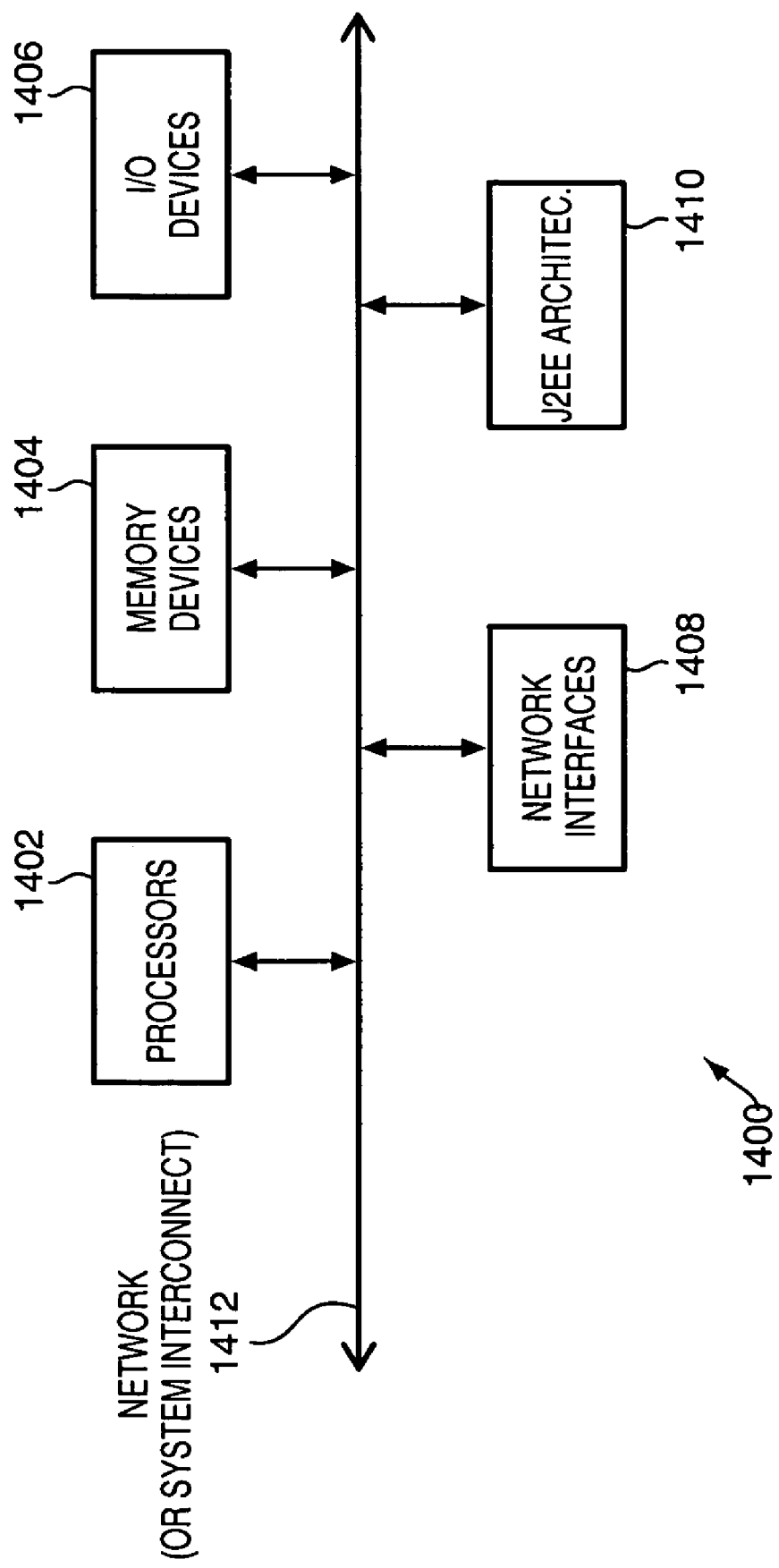
FIG. 14 is a block diagram illustrating an embodiment of a node implementation in a network.

FIG. 14 is a block diagram illustrating an embodiment of a node 1400 implementation in a network. According to one embodiment, the node 1400 may include one or more processors 1402 (e.g., processors 1302-1306 of FIG. 13), one or more memory devices 1404 (e.g., main memory 1316 of FIG. 13), one or more Input/Output (I/O) devices 1406 (e.g., I/O devices 1330 of FIG. 13), one or more network interfaces 1408, and J2EE architecture 1410, directly or indirectly, connected together and in communication with the network through a system or network interconnect 1412. The processors 1402 may include microprocessors, microcontrollers, FPGAs, application ASICs, central processing units (CPUs), programmable logic devices (PLDs), and similar devices that access instructions from a system storage (e.g., memory 1404), decode them, and execute those instructions by performing arithmetic and logical operations.

The J2EE architecture 1410 may include a deploy service to update a single file based on various J2EE and non-J2EE containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1410 may include executable content, it may be stored in the memory device 1404 and executed by the control processor 1402.

Memory devices 1404 may encompass a wide variety of memory devices including ROM, EPROM, EEPROM, RAM, non-volatile random access memory (NVRAM), cache memory, flash memory, and other memory devices. Memory devices 1404 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory devices 1404 may store program modules, such as routines, programs, objects, images, data structures, program data, and other program modules that perform particular tasks or implement particular abstract data types that facilitate system use.

The I/O devices 1406 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1412 may permit communication between the various elements of node 1400. System interconnects 1412 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:

accessing, via a deploy service, files of a software application to be updated, the software application deployed at a runtime system of an application server of a server computer system; and updating, via the deploy service, the software application by amending the files including a first file at a first container associated with a first programming engine and a second file at a second container associated with a second programming engine, the first programming engine and the second programming engine being unrelated to and independent of each other, wherein the deploy service and the first and second programming engines reside at the application server, wherein updating is performed in runtime without having to redeploy the software application or restart the runtime system, at least in part, by facilitating bi-directional communication between the deploy service and the first and second containers via a container interface having a deploy communicator in communication with the deploy service and the first and second containers, the first container and the second container being unrelated to and independent of each other;

verifying integrity of the software application, committing a transaction including the updating of the software application to a database, if the integrity is verified to be at or above an acceptable level, and providing notification from the server computer system to other server computer systems in a cluster of server computer systems, the notification including information relating to the commitment of the transaction to the database;

rolling back the transaction to a previous stage if the integrity of the software application is verified to be below the acceptable level; and communicating an exception relating to the rolling back of the transaction to the other server computer systems in the cluster.

2. The method of claim 1, wherein the amending of the files comprises adding, removing, or modifying one or more of modules, classes, and descriptive information.

3. The method of claim 1, further comprising during runtime, updating the software application by amending the files including a third file having first components of the third file at the first container associated with the first programming engine, and second components of the third file at the second container associated with the second programming engine.

4. A system comprising:

a server in a cluster of servers, the server having a processor and a storage medium coupled with the processor, the server having an application server, the application server having a deploy service to:

access files of a software application to be updated, the software application deployed at a runtime system of the application server; and update the software application by amending the files including a first file at a first container associated with a first programming engine and a second file at a second container associated with a second programming engine, the first programming engine and the second programming engine being unrelated to and independent of each other, wherein the first and second programming engines reside at the application server, wherein updating is performed in runtime without having to redeploy the software application or restart the runtime system, at least in part, by facilitating bi-directional communication between the deploy service and the first and second containers via a container interface having a deploy communicator in communication with the deploy service and the first and second containers, the first container and the second container being unrelated to and independent of each other;

verify integrity of the software application, commit a transaction including the updating of the software application to a database, if the integrity is verified to be at or above an acceptable level, and provide notification from the server computer system to other server computer systems in a cluster of server computer systems, the notification including information relating to the commitment of the transaction to the database;

roll back the transaction to a previous stage if the integrity of the software application is verified to be below the acceptable level; and communicate an exception relating to the rolling back of the transaction to the other server computer systems in the cluster.

5. The system of claim 4, wherein the application server is further modified to during runtime, update the software application by amending the files including a third file having first components of the third file at the first container associated with the first programming engine, and second components of the third file at the second container associated with the second programming engine.

6. A machine-readable storage medium comprising instructions which, when executed, cause a machine to:

access, via a deploy service, files of a software application to be updated, the software application deployed at a runtime system of an application server of a computer server system;

update, via the deploy service, the software application by amending the files including a first file at a first container associated with a first programming engine and a second file at a second container associated with a second programming engine, the first programming engine and the second programming engine being unrelated to and independent of each other, wherein the deploy service and the first and second programming engines reside at the application server, wherein updating is performed in runtime without having to redeploy the software application or restart the runtime system, at least in part, by facilitating bi-directional communication between the deploy service and the first and second containers via a container interface having a deploy communicator in communication with the deploy service and the first and second containers, the first container and the second container being unrelated to and independent of each other;

verify integrity of the software application, commit a transaction including the updating of the software application to a database, if the integrity is verified to be at or above an acceptable level, and provide notification from the server computer system to other server computer systems in a cluster of server computer systems, the notification including information relating to the commitment of the transaction to the database;

roll back the transaction to a previous stage if the integrity of the software application is verified to be below the acceptable level; and communicate an exception relating to the rolling back of the transaction to the other server computer systems in the cluster.

7. The machine-readable medium of claim 6, wherein the instructions which, when executed, further cause the machine to during runtime, update the software application by amending the files including a third file having first components of the third file at the first container associated with the first programming engine, and second components of the third file at the second container associated with the second programming engine.

* * * * *